(12) United States Patent
Li et al.

(10) Patent No.: US 12,717,206 B2
(45) Date of Patent: Aug. 25, 2026

(54) LIQUID CRYSTAL LENS, LENS MODULE, AND DISPLAY DEVICE

(71) Applicant: BOE TECHNOLOGY GROUP CO., LTD., Beijing (CN)

(72) Inventors: Zhongxiao Li, Beijing (CN); Pengxia Liang, Beijing (CN); Weili Zhao, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 212 days.

(21) Appl. No.: 18/728,929

(22) PCT Filed: Mar. 1, 2023

(86) PCT No.: PCT/CN2023/079107

§ 371 (c)(1),
(2) Date: Jul. 15, 2024

(87) PCT Pub. No.: WO2024/178684

PCT Pub. Date: Sep. 6, 2024

(65) Prior Publication Data

US 2026/0177876 A1 Jun. 25, 2026

(51) Int. Cl.
*G02F 1/29* (2006.01)

(52) U.S. Cl.
CPC .................................... *G02F 1/29* (2013.01)

(58) Field of Classification Search
CPC .................................. G02F 1/29; G02F 1/294
See application file for complete search history.

(56) References Cited

U.S. PATENT DOCUMENTS

| | | | |
|---|---|---|---|
| 9,971,166 B2 * | 5/2018 | Lee | G02B 30/27 |
| 2007/0159566 A1 | 7/2007 | Kang | |
| 2016/0054573 A1 | 2/2016 | Kasano et al. | |
| 2019/0204709 A1 * | 7/2019 | Fang | G02F 1/29 |

FOREIGN PATENT DOCUMENTS

| | | |
|---|---|---|
| CN | 102253563 A | 11/2011 |
| CN | 102508382 A | 6/2012 |
| CN | 102809868 A | 12/2012 |
| CN | 102955302 A | 3/2013 |
| CN | 103777416 A | 5/2014 |
| CN | 103926748 A | 7/2014 |
| CN | 105389171 A | 3/2016 |
| CN | 105842951 A | 8/2016 |
| CN | 106200142 A | 12/2016 |

* cited by examiner

*Primary Examiner* — Joseph L Williams
(74) *Attorney, Agent, or Firm* — The Webb Law Firm

(57) ABSTRACT

A liquid crystal lens is divided into a plurality of dimming areas by a horizontal center line and a vertical center line. The liquid crystal lens includes a liquid crystal layer, a first electrode layer on a side of the liquid crystal layer, and a second electrode layer on a side of the liquid crystal layer away from the first electrode layer. The second electrode layer includes a plurality of electrode groups. In a thickness direction of the liquid crystal lens, the first electrode layer corresponds to the dimming areas, and the electrode groups correspond to the dimming areas. At least one of the plurality of electrode groups is a specific electrode group. In the specific electrode group, included angles between extending directions of a plurality of driving electrodes and a second direction gradually increase in a direction away from the vertical center line in a first direction.

20 Claims, 20 Drawing Sheets

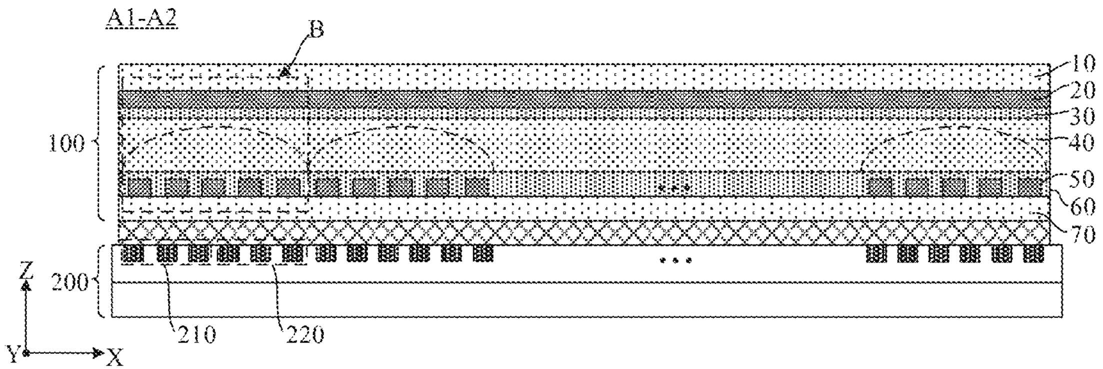
FIG. 3
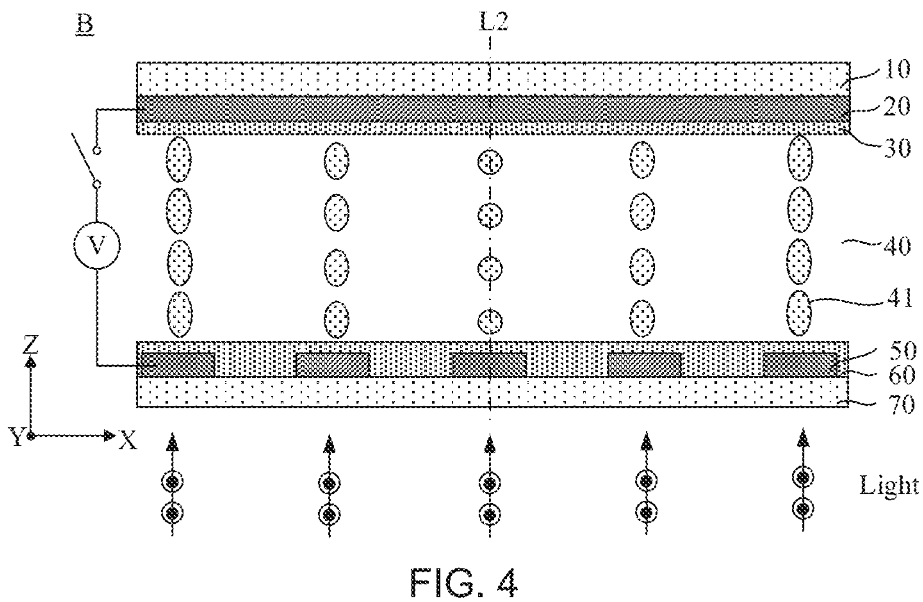
FIG. 4
B
L2
10
20
30
41
40
β
α
50
60
70
Z
Y
X
Light
FIG. 5

LIQUID CRYSTAL LENS, LENS MODULE, AND DISPLAY DEVICE

CROSS-REFERENCE TO RELATED APPLICATION

This application is the United States national phase of International Patent Application No. PCT/CN2023/079107, filed Mar. 1, 2023, the disclosure of which is hereby incorporated by reference in its entirety.

BACKGROUND OF THE INVENTION

Field of the Invention

The present disclosure relates to the field of display technologies, and in particular, to a liquid crystal lens, lens modules and a display device.

Description of Related Art

With the continuous development of display technology, 3 dimensional (3D) display has become an important development trend in the display field. The basic principle of 3D display is as that left and right eyes of a viewer are allowed to see different images to constitute a stereoscopic image pair, and then the stereoscopic image pair is visually processed by the brain of the viewer to give the viewer a three-dimensional sense of the images seen by the viewer. Naked-eye 3D display allows the viewer to directly experience the 3D effect without using any special equipment such as 3D glasses.

SUMMARY OF THE INVENTION

In an aspect, a liquid crystal lens is provided. The liquid crystal lens is divided into a plurality of dimming areas by a horizontal center line and a vertical center line. The horizontal center line is a straight line passing through an optical center of the liquid crystal lens and extending in a first direction. The vertical center line is a straight line passing through the optical center of the liquid crystal lens and extending in a second direction. The first direction and the second direction are perpendicular to each other.

The liquid crystal lens includes a liquid crystal layer, a first electrode layer and a second electrode layer. The first electrode layer is disposed on a side of the liquid crystal layer. In a thickness direction of the liquid crystal lens, the first electrode layer corresponds to the plurality of dimming areas. The second electrode layer is disposed on a side of the liquid crystal layer away from the first electrode layer. The second electrode layer includes a plurality of electrode groups. In the thickness direction of the liquid crystal lens, the electrode groups correspond to the dimming areas. An electrode group includes a row of driving electrodes arranged in the first direction.

At least one of the plurality of electrode groups is a specific electrode group. The specific electrode group includes a plurality of driving electrodes, and tilt angles of the plurality of driving electrodes in the specific electrode group increase in a direction away from the vertical center line in the first direction. A tilt angle of a driving electrode is an included angle between an extending direction of the driving electrode and the second direction.

In some embodiments, an end of each driving electrode away from the horizontal center line is a distal end of the driving electrode, and an end of each driving electrode proximate to the horizontal center line is a proximal end of the driving electrode. The plurality of electrode groups include a first specific electrode group and a second specific electrode group that are located on a same side of the vertical center line. A distal end of a driving electrode in the first specific electrode group is further away from the vertical center line than a proximal end thereof. A distal end of a driving electrode in the second specific electrode group is further away from the vertical center line than a proximal end thereof.

In some embodiments, the first specific electrode group and the second specific electrode group are axially symmetrical about the horizontal center line.

In some embodiments, an end of each driving electrode away from the horizontal center line is a distal end of the driving electrode, and an end of each driving electrode proximate to the horizontal center line is a proximal end of the driving electrode. The specific electrode group includes a first driving electrode and a second driving electrode, and the first driving electrode is further away from the vertical center line than the second driving electrode. A distal end of the first driving electrode is closer to the vertical center line than a proximal end thereof; and a distal end of the second driving electrode is closer to the vertical center line than a proximal end thereof. A distance between the distal end of the first driving electrode and the horizontal center line is greater than a distance between the distal end of the second driving electrode and the horizontal center line.

In some embodiments, the distal end of the first driving electrode and/or the distal end of the second driving electrode are located on the vertical center line.

In some embodiments, the plurality of electrode groups include a third specific electrode group and a fourth specific electrode group that are located on both sides of the vertical center line. At least one driving electrode in the third specific electrode group is connected to at least one driving electrode in the fourth specific electrode group.

In some embodiments, all driving electrodes in the specific electrode group are located on a same side of the vertical center line.

In some embodiments, the plurality of electrode groups include a fifth specific electrode group and a sixth specific electrode group that are located on a same side of the vertical center line. A plurality of driving electrodes in the fifth specific electrode group are respectively connected to a plurality of driving electrodes in the sixth specific electrode group, or each driving electrode in the fifth specific electrode group is insulated from all driving electrodes in the sixth specific electrode group.

In some embodiments, in the specific electrode group, proximal ends of the plurality of driving electrodes have an equal spacing therebetween; and a proximal end of each driving electrode is an end of the driving electrode proximate to the horizontal center line.

In some embodiments, in the plurality of electrode groups, two electrode groups located on a same side of the horizontal center line are axially symmetrical about the vertical center line.

In some embodiments, the liquid crystal lens further includes a plurality of edge electrodes. Extending directions of the edge electrodes are parallel to the vertical center line. The edge electrodes are each located on a side of an electrode group away from the vertical center line.

In some embodiments, the specific electrode group includes a third driving electrode and a fourth driving electrode. The third driving electrode is further away from an edge electrode adjacent to the specific electrode group than the fourth driving electrode. A distance between a distal end of the third driving electrode and the horizontal center line is greater than a distance between a distal end of the fourth driving electrode and the horizontal center line. Alternatively, a connection line of the distal end of the third driving electrode and the distal end of the fourth driving electrode is parallel to the horizontal center line. A distal end of each driving electrode is an end of the driving electrode away from the horizontal center line.

In some embodiments, the plurality of driving electrodes in the specific electrode group are insulated from each other.

In some embodiments, a width of the driving electrode is equal everywhere.

In some embodiments, the driving electrodes are in shapes of curves, and the driving electrodes are convex in a direction away from the vertical center line in the first direction. Alternatively, the driving electrodes are in shapes of straight strips.

In some embodiments, the liquid crystal lens further includes a center electrode, and a straight line where the center electrode is located coincides with the vertical center line.

In some embodiments, the liquid crystal lens further includes a first alignment layer and/or a second alignment layer. The first alignment layer is disposed between the liquid crystal layer and the first electrode layer, and an alignment direction of the first alignment layer is parallel to the second direction. The second alignment layer is disposed between the liquid crystal layer and the second electrode layer, and an alignment direction of the second alignment layer is parallel to the second direction.

In some embodiments, the liquid crystal lens is composed of a plurality of liquid crystal sub-lenses by tiling. Portions of the liquid crystal layer located in different liquid crystal sub-lenses are isolated from each other, and at least two of the plurality of electrode groups in the liquid crystal lens are distributed in different liquid crystal sub-lenses.

In another aspect, a lens module is provided. The lens module includes a plurality of liquid crystal lenses each as described in any of the above embodiments, and the plurality of liquid crystal lenses are connected.

In yet another aspect, a lens module is provided. The lens module includes a plurality of lens sub-modules configured to be tiled into at least one liquid crystal lens. The liquid crystal lens is divided into M dimming areas by at least one horizontal center line and at least one vertical center line; a horizontal center line is a straight line passing through an optical center of a liquid crystal lens and extending in a first direction, and a vertical center line is a straight line passing through the optical center of the liquid crystal lens and extending in a second direction. The first direction and the second direction are perpendicular to each other.

A lens sub-module includes a liquid crystal sub-layer, a first electrode sub-layer and a second electrode sub-layer. The first electrode sub-layer is disposed on a side of the liquid crystal sub-layer. In a thickness direction of the liquid crystal lens, the first electrode sub-layer corresponding to N dimming areas of the liquid crystal lens, where N is greater than or equal to 1 and less than or equal to M. The second electrode sub-layer is disposed on a side of the liquid crystal sub-layer away from the first electrode sub-layer. The second electrode sub-layer includes an electrode group corresponding to each of the N dimming areas. In the thickness direction of the liquid crystal lens, N electrode groups are in one-to one correspondence to the N dimming areas. The electrode group includes a row of driving electrodes arranged in the first direction.

At least one of the N electrode groups is a specific electrode group. The specific electrode group includes a plurality of driving electrodes, and tilt angles of the plurality of driving electrodes in the specific electrode group increase in a direction away from the vertical center line in the first direction. A tilt angle of a driving electrode is an included angle between an extending direction of the driving electrode and the second direction.

In yet another aspect, a display device is provided. The display device includes a display panel and the liquid crystal lens as described in any of the above embodiments. The liquid crystal lens is disposed on a light exit side of the display panel.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, but are not limitations on an actual size of a product, an actual process of a method and an actual timing of a signal to which the embodiments of the present disclosure relate.

FIG. 3 is a sectional view taken along a section line A1-A2 in FIG. 2;

FIG. 4 is an enlarged view of an area B in FIG. 3;

FIG. 5 is a schematic diagram of an arrangement state of liquid crystal molecules of a liquid crystal lens in an initial state provided by embodiments of the present disclosure;

DESCRIPTION OF THE INVENTION

Figure 1:
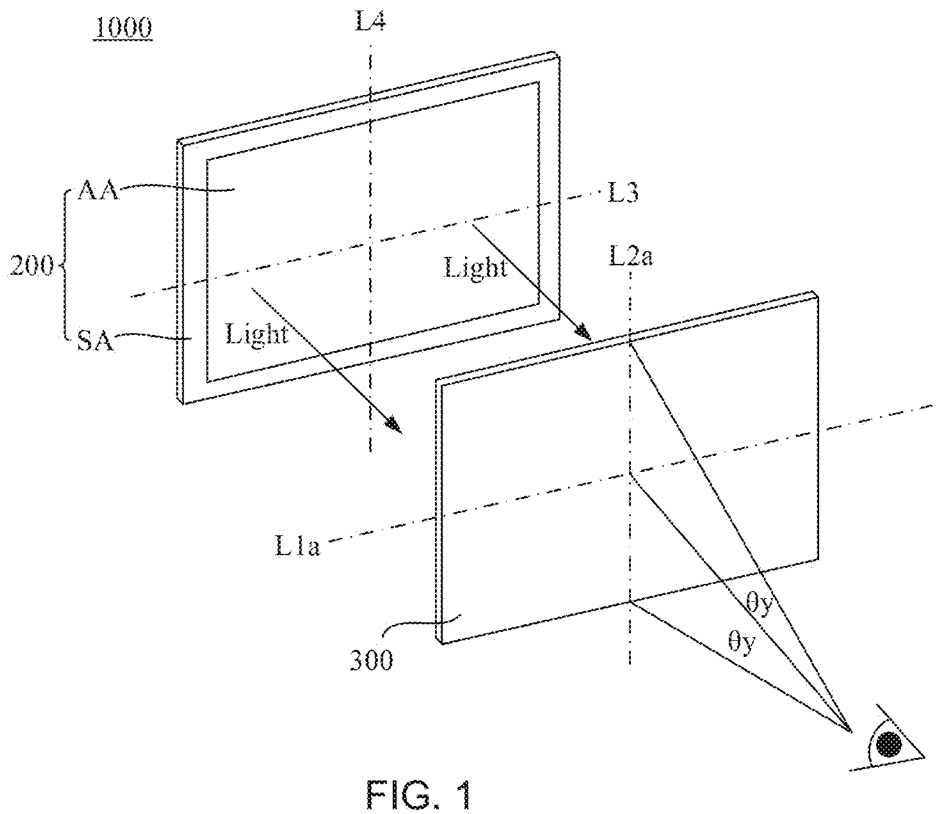
FIG. 1 is a perspective view of a display device provided by embodiments of the present disclosure.

Technical solutions in some embodiments of the present disclosure will be described clearly and completely with reference to the accompanying drawings below. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as open and inclusive, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics described herein may be included in any one or more embodiments or examples in any suitable manner.

Hereinafter, the terms such as "first" and "second" are used for descriptive purposes only, and are not to be construed as indicating or implying the relative importance or implicitly indicating the number of indicated technical features. Thus, features defined with "first" or "second" may explicitly or implicitly include one or more of the features. In the description of the embodiments of the present disclosure, the term "a plurality of" or "the plurality of" means two or more unless otherwise specified.

In the description of some embodiments, the expressions "coupled" and "connected" and derivatives thereof may be used. The term "connection" should be understood in a broad sense. For example, the "connection" may be a fixed connection, a detachable connection, or of an integrated structure; it may be a direct connection or an indirect connection by an intermediate medium. The term "coupled" indicates, for example, that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the content herein.

The phrase "at least one of A, B and C" has a same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

The phrase "applicable to" or "configured to" as used herein indicates an open and inclusive expression, which does not exclude devices that are applicable to or configured to perform additional tasks or steps.

In addition, the use of the phrase "based on" is meant to be open and inclusive, since a process, step, calculation or other action that is "based on" one or more of the stated conditions or values may, in practice, be based on additional conditions or values exceeding those stated.

The term "about", "substantially" or "approximately" as used herein includes a stated value and an average value within an acceptable range of deviation of a particular value. The acceptable range of deviation is determined by a person of ordinary skill in the art in consideration of the measurement in question and errors associated with the measurement of a particular quantity (i.e., limitations of the measurement system).

The term such as "parallel", "perpendicular" or "equal" as used herein includes a stated condition and a condition similar to the stated condition. A range of the similar condition is within an acceptable range of deviation. The acceptable range of deviation is determined by a person of ordinary skill in the art in view of measurement in question and errors associated with the measurement of a particular quantity (i.e., limitations of the measurement system). For example, the term "parallel" includes absolute parallelism and approximate parallelism, and an acceptable range of deviation of the approximate parallelism may be a deviation within 5°; the term "perpendicular" includes absolute perpendicularity and approximate perpendicularity, and an acceptable range of deviation of the approximate perpendicularity may also be a deviation within 5°; and the term "equal" includes absolute equality and approximate equality, and an acceptable range of deviation of the approximate equality may be a difference between two equals being less than or equal to 5% of either of the two equals.

It will be understood that when a layer or element is referred to as being on another layer or substrate, the layer or element may be directly on the another layer or substrate, or there may be intermediate layer(s) between the layer or element and the another layer or substrate.

Exemplary embodiments are described herein with reference to sectional views and/or plan views as idealized exemplary drawings. In the accompanying drawings, thicknesses of layers and sizes of areas are enlarged for clarity. Variations in shapes relative to the accompanying drawings due to, for example, manufacturing technologies and/or tolerances may be envisaged. Therefore, the exemplary embodiments should not be construed to be limited to the shapes of areas shown herein, but to include deviations in the shapes due to, for example, manufacturing. For example, an etched area shown in a rectangular shape generally has a feature of being curved. Therefore, the areas shown in the accompanying drawings are schematic in nature, and their shapes are not intended to show actual shapes of the areas in a device, and are not intended to limit the scope of the exemplary embodiments.

The related art is to provide a grating structure in front of a light source array of the display to allow left and right eyes of a viewer to see different images, thus forming a 3 dimensional (3D) display effect. However, a line width and seams of the grating structure are limited by the etching process, resulting in poor period uniformity of the lens and poor 3D display effect. In addition, since the structures of the line width and the seams are fixed and cannot be changed, the grating structure may only achieve 3D display and cannot switch between 2D display and 3D display.

In order to solve the above problem, some embodiments of the present disclosure provide a display device. The display device is an electronic device having a function of displaying images (including a still image or a moving image, where the moving image may be a video). For example, the display device may be any one of a display, a television, a billboard, a digital photo frame, a laser printer having a display function, a telephone, a mobile phone, a personal digital assistant (PDA), a digital camera, a portable camcorder, a viewfinder, a navigator, a large-area wall, home appliance, an information search device (e.g., a business search device for a department of e-government, bank, hospital or electricity), a monitor, an electronic picture screen, and a car display, and is not limited thereto.

Figure 2:
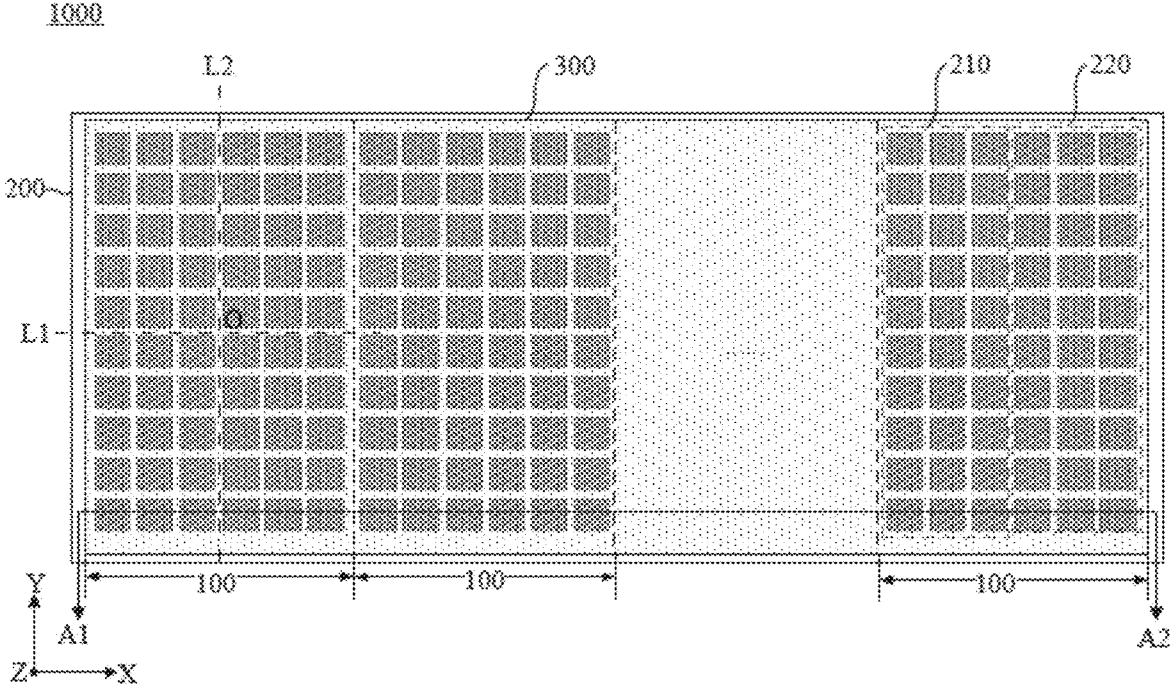
FIG. 2 is a top view of a display device provided by embodiments of the present disclosure.

FIG. 1 is a perspective view of a display device provided by embodiments of the present disclosure. FIG. 2 is a top view of a display device provided by embodiments of the present disclosure.

Referring to FIG. 1, the display device 1000 includes a display panel 200 and a lens module 300. The lens module 300 is disposed on a light exit side of the display panel 200. The display panel 200 and the lens module 300 are disposed at intervals, but are not limited thereto. In some embodiments, the lens module 300 may be attached to the display panel 200. For example, the lens module 300 is connected to the display panel 200 by an adhesive layer. The material of the adhesive layer may be optical clear adhesive (OCA) or other transparent adhesives that may achieve bonding.

The display panel 200 is used to provide images. The display panel 200 includes a display area and a non-display area SA. The display area AA is an area of the display panel 200 for displaying pictures, and the non-display area SA is an area of the display panel 200 other than the display area AA. The non-display area SA may be located on at least one side (e.g., one or more sides) of the display area AA. For example, the non-display area SA may be disposed around the display area AA.

Referring to FIG. 2, the display panel 200 includes a plurality of left eye display units 210 and a plurality of right eye display units 220 that are spaced apart. The left eye display unit 210 includes at least one column (e.g., one or more columns) of sub-pixels. For example, the left eye display unit 210 includes a column of red sub-pixels, a column of green sub-pixels, or a column of blue sub-pixels. As another example, the left eye display unit 210 includes a column of red sub-pixels, a column of green sub-pixels, and a column of blue sub-pixels. All sub-pixels of the same luminous color may be arranged in an array. For the structure of the right eye display unit 220, reference may be made to the introduction of the structure of the left eye display unit 210, and details are not repeated here. The left eye display unit 210 displays a left-eye image, and the right eye display unit 220 displays a right-eye image, so that the left eye of the viewer sees the left-eye image, and the right eye of the viewer sees the right-eye image.

With continued reference to FIG. 1, in some embodiments, the display panel 200 may be, for example, a self-luminous display panel. The display panel 200 may be, for example, any one of an organic light-emitting diode (OLED) display panel, a quantum dot light-emitting diode (QLED) display panel, and a tiny light-emitting diode (mini LED or micro LED) display panel.

In some other embodiments, the display device 1000 includes a display panel 200 and a backlight module (not shown in figures). The display panel 200 is a non-self-luminous display panel, such as a liquid crystal display panel. The backlight module is disposed on a back (i.e., a side away from the lens module 300) of the display panel 200 and is configured to provide backlight for the display panel 200.

With continued reference to FIG. 2, the lens module 300 is configured to form a plurality of liquid crystal lenses 100, and the plurality of liquid crystal lenses 100 are connected. The plurality of liquid crystal lenses 100 may be arranged in a row. Although FIG. 2 shows a limited number of liquid crystal lenses 100, the number of the liquid crystal lenses 100 in the lens module 300 is not limited.

The liquid crystal lens 100 is an optical component that converges or diverging light by utilizing birefringence characteristics of liquid crystal molecules and characteristics of the liquid crystal molecules arranged with changes in electric field distribution. Each liquid crystal lens 100 covers at least one (e.g., one or more) left eye display unit 210 and at least one (e.g., one or more) right eye display unit 220. A voltage is applied to the liquid crystal lens 100 to cause the liquid crystal molecules in the liquid crystal lens 100 to be deflected to form a specific arrangement. Such specific arrangement makes the liquid crystal lens equivalent to a convex lens structure. When the display area AA of the display panel 200 performs display, light is emitted by the left eye display unit 210 and the right eye display unit 220 respectively, and then is refracted by the liquid crystal lens 100 to enter the eyes of the viewer.

For facilitating description of the following contents, an XYZ coordinate system is established. The horizontal center line L1 of the liquid crystal lens 100 is a straight line passing through the optical center O of the liquid crystal lens 100 and extending in the first direction X. The vertical center line L2 of the liquid crystal lens 100 is a straight line passing through the optical center O of the liquid crystal lens 100 and extending in the second direction Y. The first direction X and the second direction Y are perpendicular to each other. The third direction Z is along a thickness direction of the liquid crystal lens 100 and is perpendicular to a plane defined by the first direction X and the second direction Y. In addition, the horizontal center line L1 of the liquid crystal lens 100 and a horizontal center line L3 of the display panel 200 in FIG. 1 may be parallel, for example, may coincide. The horizontal center line of the display panel 200 is a straight line passing through a center (e.g., a geometric center) of the display area AA of the display panel 200 and extending in the first direction X. The first direction X is substantially parallel to a carrying plane of the display device 1000, the ground, or a connection line of the eyes of the viewer.

FIG. 3 is a sectional view taken along a section line A1-A2 in FIG. 2. FIG. 4 is an enlarged view of an area B in FIG. 3.

Referring to FIGS. 3 and 4, the liquid crystal lens 100 includes a first substrate 10, a second substrate 70, a first electrode layer 20, a second electrode layer 50 and a liquid crystal layer 40.

The first substrate 10 and the second substrate 70 are provided oppositely. The first substrate 10 may have a single-layer structure or a multi-layer structure. The material of the first substrate 10 may include any one of transparent plastic, transparent glass or transparent quartz. The thickness of the first substrate 10 is not particularly limited and may be appropriately controlled as needed. The structure, material and thickness of the second substrate 70 may refer to the introduction of the first substrate 10, and details are not repeated here.

The liquid crystal layer 40 is disposed between the first substrate 10 and the second substrate 70. The liquid crystal layer 40 includes a plurality of liquid crystal molecules 41. These liquid crystal molecules 41 may be distributed at a uniform density throughout an entire area of the liquid crystal layer 40 (only part of the liquid crystal molecules 41 are shown in FIG. 4). The liquid crystal molecule 41 belongs to a uniaxial crystal and has only a single optical axis. The optical axis is also called an optic axis. When light travels in the crystal, a direction in which two orthogonal waves travel at the same speed is an extending direction of the optical axis, and there is no change in optical properties of light in this direction. The liquid crystal molecules may be divided into rod-type liquid crystal molecules and discotic liquid crystal molecules according to shapes thereof. For rod-type liquid crystal molecules, a direction of a long axis is a direction of the optical axis. For discotic liquid crystal molecules, a direction of a short axis is the direction of the optical axis. In some embodiments, the liquid crystal molecules 41 in the liquid crystal layer 40 are rod-type liquid crystal molecules, and the direction of the long axis of the rod-type liquid crystal molecules is the direction of the optical axis. The liquid crystal molecules 41 may be positive liquid crystal molecules or negative liquid crystal molecules. In the present embodiments, the liquid crystal molecules are positive liquid crystal molecules.

The initial orientation directions of all liquid crystal molecules 41 may be substantially parallel. Specifically, orthographic projections of the optical axes (e.g., long axes of the rod-type liquid crystal molecules) of the liquid crystal molecules 41 on the first substrate 10 are parallel to each other. In the embodiments of the present disclosure, the initial orientation directions of the liquid crystal molecules 41 are parallel to the second direction Y.

FIG. 5 is a schematic diagram of an arrangement state of liquid crystal molecules in the liquid crystal lens in an initial state in embodiments of the present disclosure.

In some embodiments, the liquid crystal molecules 41 may also generate a pretilt angle, which is an acute angle between the long axis of the liquid crystal molecule 41 and the initial orientation direction when no electric field is applied to the liquid crystal layer 40. The degree of the pretilt angle may be small. For example, the pretilt angle is in a range of 1° to 3° (2±1°), that is, in the range of [1°, 3°]. For example, the pretilt angle is 1°. The pretilt angle may have a direction. In a YZ plane, if an optical axis of a liquid crystal molecule 41 is rotated counterclockwise by an acute angle relative to the initial orientation direction to form a pretilt angle of the liquid crystal molecule 41, the pretilt angle is expressed as a positive number, which is called a position pretilt angle; and if the optical axis of the liquid crystal molecule 41 is rotated clockwise by an acute angle relative to the initial orientation direction to form a pretilt angle of the liquid crystal molecule 41, the pretilt angle is expressed as a negative number, which is called a negative pretilt angle. Specifically, referring to FIG. 5, the pretilt angles of the plurality of liquid crystal molecules 41 include a first pretilt angle $\alpha$ and a second pretilt angle $\beta$. The directions (also called positive and negative) of the first pretilt angle $\alpha$ and the second pretilt angle $\beta$ may be the same or different, which is not limited in the present embodiments. For example, FIG. 5 shows a case where the first pretilt angle $\alpha$ and the second pretilt angle $\beta$ of the liquid crystal molecules on two sides of the vertical center line L2 are equal and have opposite directions. For example, the first pretilt angle $\alpha$ may be 2°, and the second pretilt angle $\beta$ may be −2°. In this case, the liquid crystal molecules located on the left and right sides of the vertical center line L2 in FIG. 5 are roughly symmetrically distributed, so that the upward viewing effect and the downward viewing effect of the user are close. As another example, in the thickness direction of the liquid crystal lens 100, the pretilt angles of the liquid crystal molecules in the liquid crystal layer 40 may also have different directions.

With continued reference to FIG. 4, the first electrode layer 20 is disposed on a side of the liquid crystal layer 40. In the embodiments of the present disclosure, the first electrode layer 20 is located between the first substrate 10 and the liquid crystal layer 40. The first electrode layer 20 is a planar electrode. The boundary of the first electrode layer 20 is an enclosed contour line, and the contour line surrounds the display area AA of the display panel 200 or overlaps at least partially (partially or completely) with an edge of the display area AA. The material of the first electrode layer 20 may include at least one of indium tin oxide (ITO), indium zinc oxide (IZO), zinc oxide (ZO), indium oxide (IO), titanium oxide (TiO), and other transparent conductive materials, or include other suitable materials.

The second electrode layer 50 is disposed on a side of the liquid crystal layer 40 away from the first electrode layer 20. In the embodiments of the present disclosure, the second electrode layer 50 is located between the second substrate 70 and the liquid crystal layer 40. The second electrode layer 50 includes a row of driving electrodes arranged in the first direction X, and the driving electrodes are strip electrodes. Each driving electrode is connected to at least one signal line for applying a voltage to the driving electrode. For the material of the second electrode layer 50, reference may be made to the introduction of the material of the first electrode layer 20 above, and details are not repeated here. The first electrode layer 20 and the second electrode layer 50 may be made of the same material or different materials, which is not limited in the embodiments of the present disclosure. In another implementation, positions of the first electrode layer 20 and the second electrode layer 50 may be interchanged;

that is, the second electrode layer 50 is located between the first substrate 10 and the liquid crystal layer 40, and the first electrode layer 20 is located between the second substrate 70 and the liquid crystal layer 40.

Figure 6:
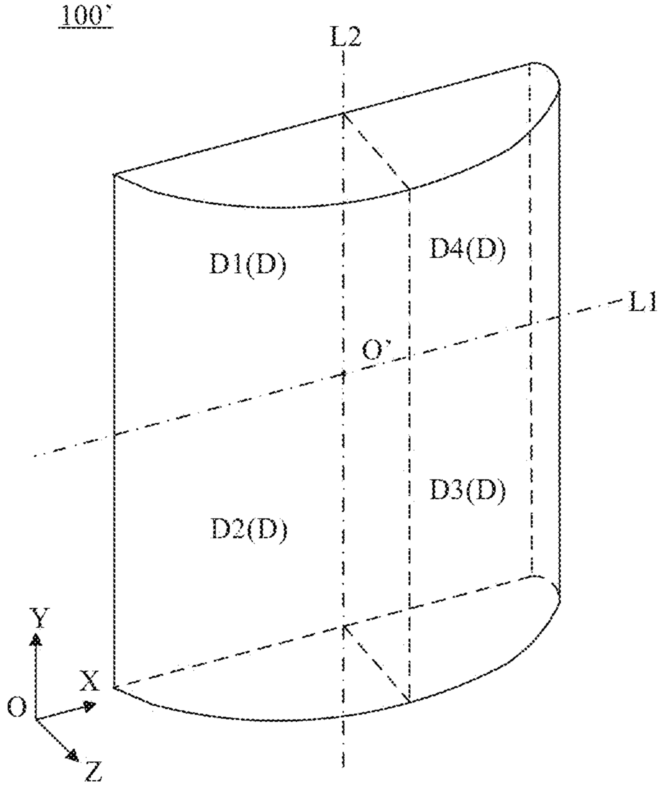
FIG. 6 is an equivalent structural diagram of a liquid crystal lens provided by embodiments of the present disclosure.

FIG. 6 is an equivalent structural diagram of a liquid crystal lens provided by embodiments of the present disclosure.

The first electrode layer 20 and the second electrode layer 50 of the liquid crystal lens 100 is provided with a voltage, and the liquid crystal lens 100 forms an equivalent convex lens structure 100' shown in FIG. 6. Referring to FIG. 6, the convex lens structure 100' has an optical center O', the optical center O' of the convex lens structure 100' coincides with the optical center O of the liquid crystal lens 100, and the convex direction is the thickness direction of the liquid crystal lens 100.

Viewed along the third direction Z, the liquid crystal lens 100 is divided into a plurality of (e.g., four) dimming areas D by the horizontal center line L1 and the vertical center line L2. For example, the plurality of dimming areas D include a first dimming area D1, a second dimming area D2, a third dimming area D3 and a fourth dimming area D4. An orthographic projection of the dimming area D on the display panel 200 is located within the display area AA of the display panel 200. The light exiting from the display panel 200 enters the dimming area D of the liquid crystal lens 100 and is irradiated from the dimming area D of the liquid crystal lens 100 to the human eye.

In the third direction Z, the first electrode layer 20 corresponds to the positions of the plurality of dimming areas D. For example, the first electrode layer 20 may also be divided into a plurality of (e.g., four) parts by the horizontal center line L1 and the vertical center line L2. The plurality of parts are in one-to-one correspondence to the plurality of dimming areas D, and each part is located in a respective dimming area D.

With continued reference to FIG. 4, voltages are applied to the first electrode layer 20 and the second electrode layer 50. An electric field is generated between the first electrode layer 20 and the second electrode layer 50, and the electric field drives the liquid crystal molecules 41 to be deflected. By optimizing arrangement of a row of driving electrodes in the second electrode layer 50, distribution of the electric field between the first electrode layer 20 and the second electrode layer 50 is adjusted, and the intermolecular force and electric field distribution of the liquid crystal molecules 41 are fully utilized to balance the twisting force of the liquid crystal molecules 41 and adjust the deflection angle of the liquid crystal molecules 41. The light enters the liquid crystal lens 100 along the third direction Z, and exits out of the liquid crystal lens 100 from the first substrate 10 passing through the second substrate 70, the second electrode layer 50, the liquid crystal layer 40, the first electrode layer 20 and the first substrate 10 in sequence.

In some embodiments, with continued reference to FIG. 4, the liquid crystal lens 100 further includes at least one (e.g., one or two) alignment layer for guiding alignment directions of the liquid crystal molecules 41. Each alignment layer is disposed on a side of the liquid crystal layer 40. The liquid crystal lens 100 may include any of the first alignment layer 30 and the second alignment layer 60, or may include both the first alignment layer 30 and the second alignment layer 60. For example, the first alignment layer 30 and the liquid crystal layer 40 are stacked and provided between the liquid crystal layer 40 and the first electrode layer 20; and the second alignment layer 60 is provided between the liquid crystal layer 40 and the second electrode layer 50. The material of the alignment layer may be at least one of polyimide (PI), silicon oxide, diamond like carbon (DLC), and other materials with good light transmittance. In addition, the material of the first alignment layer 30 and the material of the second alignment layer 60 may be the same or different.

The alignment layer has an alignment direction. For example, the alignment direction is parallel to the second direction Y. Under the influence of the alignment direction of the alignment layer, an orthographic projection of the long axis of the liquid crystal molecule 41 proximate to the alignment layer on the alignment layer is parallel to the alignment direction, thereby forming the initial orientation direction of the liquid crystal molecule 41. Specifically, an initial orientation direction of the liquid crystal molecule 41 proximate to the first alignment layer 30 is parallel or approximately parallel to the alignment direction of the first alignment layer 30, and an initial orientation direction of the liquid crystal molecule 41 proximate to the second alignment layer 60 is parallel or approximately parallel to the alignment direction of the second alignment layer 60. For example, the alignment direction of the first alignment layer 30 is parallel to the second direction Y, and the alignment direction of the second alignment layer 60 is parallel to the second direction Y. Since the alignment directions of the first alignment layer 30 and the second alignment layer 60 are the same, it can be considered that the directions of the long axes of the liquid crystal molecules 41 actually proximate to the first alignment layer 30 and the directions of the long axes of the liquid crystal molecules 41 actually proximate to the second alignment layer 60 are approximately parallel, and the initial orientation directions of the liquid crystal molecules 41 are the same. In addition, since the liquid crystal molecules 41 in the first liquid crystal layer 40 have intermolecular forces therebetween, the long axes of the liquid crystal molecules 41 in the liquid crystal layer 40 may be parallel or approximately parallel to each other, thus it can be considered that the long axes of the liquid crystal molecules 41 in the liquid crystal layer 40 are all parallel or approximately parallel to a plane where the first alignment layer 30 is located and/or a plane where the second alignment layer 60 is located, and are all parallel or approximately parallel to the alignment directions of the first alignment layer 30 and the second alignment layer 60.

On a basis that the alignment direction is determined, the pretilt angle of the liquid crystal molecule 41 is an acute angle between the long axis of the liquid crystal molecule 41 and the alignment direction. When no electric field is applied, the extending direction of the long axis of the liquid crystal molecule 41 is a direction after rotating the pretilt angle based on the initial orientation direction.

With continued reference to FIG. 4, in the first direction X, the electric field generated between the first electrode layer 20 and the second electrode layer 50 may be an arched electric field. The intensity of the electric field decreases and then increases, and is lowest at the vertical center line L2. Due to the influence of the electric field, the liquid crystal molecules 41 are deflected. Specifically, the long axes of the liquid crystal molecules 41 are longer than the short axes thereof. The initial orientation directions of the liquid crystal molecules are along the second direction Y, and the twisting force required to deflect the liquid crystal molecules 41 in the YZ plane is much smaller than the twisting force required to deflect the liquid crystal molecules 41 in an XZ plane. Therefore, the liquid crystal molecules 41 will be deflected in the YZ plane due to action of the electric field.

As shown in FIG. 4, the deflection angles of the liquid crystal molecules 41 in the YZ plane decrease and then increase.

Figure 7:
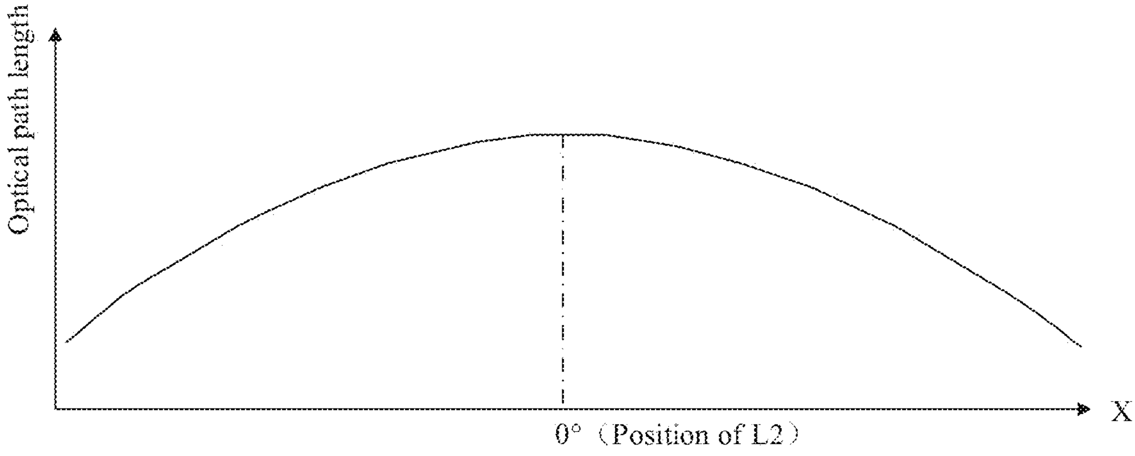
FIG. 7 is a diagram of an optical path length distribution curve of a liquid crystal lens.

FIG. 7 is an optical path length distribution curve diagram of a liquid crystal lens.

Referring to FIGS. 4 and 7, for incident light polarized along the second direction Y, after voltages are applied to the first electrode layer 20 and the second electrode layer 50, the larger an angle between the long axis of the liquid crystal molecule 41 and the XY plane, the smaller the optical path length; and the smaller the angle between the long axis of the liquid crystal molecule 41 and the XY plane, the larger the optical path length. That is to say, the larger the deflection angle of the liquid crystal molecule 41 relative to the initial state in the YZ plane, the smaller the optical path length. As shown in FIG. 4, in the first direction X, the deflection angles of the liquid crystal molecules 41 relative to the initial states in the YZ plane decrease and then increase, so that total optical path length distribution increases and then decreases, which presents an arch shape.

In some other implementations, the initial orientation directions of the liquid crystal molecules 41 are parallel to the first direction X. Then, due to the action of the electric field between the first electrode layer 20 and the second electrode layer 50, the twisting force required to deflect the liquid crystal molecules 41 in the YZ plane is much smaller than the twisting force required to deflect the liquid crystal molecules 41 in the XZ plane. Therefore, the liquid crystal molecules 41 will be deflected in the YZ plane due to action of the electric field.

Figure 8:
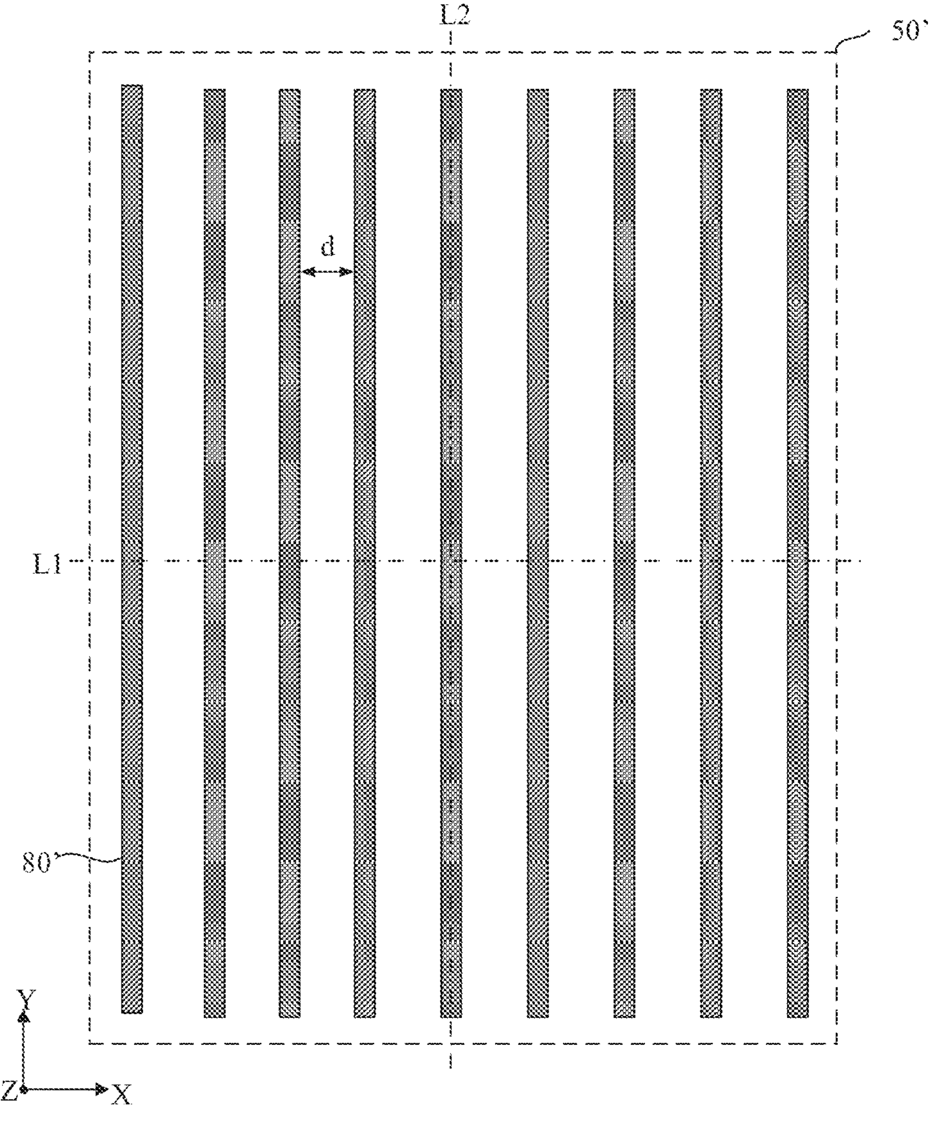
FIG. 8 is a partial structural diagram of a second electrode layer provided in the related art.

FIG. 8 is a partial structural diagram of a second electrode layer provided in the related art.

In the related art, when the human eye views a small-sized display device, it is assumed that the human eye is directly in front of the small-sized display device, if the viewer wants to see the image displayed in the entire display area, the viewing angle will not change significantly, and an included angle between a sight line and the third direction Z is roughly a positive viewing angle. That is to say, the human eye and the lens module are always in a positive viewing angle, and there is no need to look down or look up at the lens module. The light source array of the display device sequentially transmits the left-eye image and the right-eye image through the liquid crystal lens of the lens module, so that the left eye of the viewer sees the left-eye image, and the right eye of the viewer sees the right-eye image, thereby achieving naked-eye 3D display.

In this case, referring to FIG. 8, the second electrode layer 50' of the liquid crystal lens includes a plurality of driving electrodes 80' arranged in the first direction X. Any two adjacent driving electrodes 80' have an equal spacing d therebetween. Each driving electrode 80' is provided with a voltage through a signal line, and the liquid crystal molecules in the liquid crystal layer are deflected due to the influence of the electric field generated between the first electrode layer and the second electrode layer 50'. Since any adjacent driving electrodes 80' have the equal spacing d therebetween, on the same side of the vertical center line L2, the liquid crystal molecules 41 at positions of the same distances d to the vertical center line L2 have the same deflection angles. Along the first direction X, since the intensity of the electric field decreases and then increases, the deflection angles of the liquid crystal molecules in the YZ plane decrease and then increase. When the human eye and the lens module are always at a positive viewing angle, the optical path length distribution curve of the liquid crystal lens is a positive viewing angle optical path length distribution curve (an optical path length distribution ideal curve), and the shape of the curve is a smooth arch.

In application scenarios of TVs, monitors and movie theaters, the display device 1000 has a relatively large size. Accordingly, the lens module 300 in the display device also has a relatively large size. With continued reference to FIG. 1, the lens module 300 has a horizontal center line L1*a* and a vertical center line L2*a*, and the vertical center line L2*a* is perpendicular to the horizontal center line L1*a*. The vertical center line L2*a* of the lens module 300 and a vertical center line L4 of the display panel 200 may be parallel, for example, may coincide. The vertical center line of the display panel 200 is a straight line passing through a center (e.g., a geometric center) of the display area AA of the display panel 200 and extending in the second direction Y. The second direction Y is substantially perpendicular to the ground.

When the viewer views a large-sized display device 1000, it is assumed that the human eye is directly in front of the center of the display panel 200, if the viewer wants to see the image displayed in the entire display area AA, the viewing angle will change significantly. For example, when the viewer views an image displayed at the center of the display area AA (i.e., the viewpoint is located at the center of the display area AA), the viewing angle (i.e., an included angle between the sight line and the third direction Z) may be 0°, and the viewing angle may be called a positive viewing angle. When the viewer views an image displayed at the edge of the display area AA, the viewing angle is relatively large. Specifically, when the viewer looks up at the upper half of the display area AA, for example, when the viewpoint is located at the upper half of the vertical center line L4 of the display panel 200 (in other words, the viewpoint is located at the upper half of the vertical center line L2*a* of the lens module 300), a horizontal viewing angle is 0° and a vertical viewing angle is θy (expressed as a positive number); when the viewer looks down at the lower half of the display area AA, for example, when the viewpoint is located at the lower half of the vertical center line L4 of the display panel 200 (in other words, the viewpoint is located at the lower half of the vertical center line L2*a* of the lens module 300), a horizontal viewing angle is 0° and a vertical viewing angle is θy (expressed as a negative number). That is, as the viewpoint moves from top to bottom, an absolute value of the vertical viewing angle decreases and then increases. Similarly, when the viewer views the left half of the display area AA, for example, when the viewpoint is located at the left half of the horizontal center line L3 of the display panel 200 (in other words, the viewpoint is located at the left half of the horizontal center line L1*a* of the lens module 300), the vertical viewing angle is 0° and the horizontal viewing angle is θx (expressed as a negative number); when the viewer views the right half of the display area AA, for example, when the viewpoint is located at the right half of the horizontal center line L3 of the display panel 200 (in other words, the viewpoint is located at the right half of the horizontal center line L1*a* of the lens module 300), the vertical viewing angle is 0°, and the horizontal viewing angle is θx (expressed as a positive number).

If the viewpoint is located neither on the horizontal center line L3 of the display panel 200 nor on the vertical center line L4 of the display panel 200, an included angle between a straight line for connecting a vertical point of the viewpoint on the horizontal center line L3 to the human eye and the third direction Z may serve as a horizontal viewing angle of the viewpoint; and an included angle between a straight line for connecting a vertical point of the viewpoint on the vertical center line L4 to the human eye and the third direction Z may serve as a vertical viewing angle of the viewpoint. For a liquid crystal lens 100, if a plurality of driving electrodes in the second electrode layer 50 are still arranged according to the scheme of FIG. 8, that is, the plurality of driving electrodes in the first direction X are all parallel to the vertical center line L2 and are arranged at equal intervals. In this case, the liquid crystals at the same distances to the vertical center line L2 are applied with the same electric field, thus these liquid crystal molecules 41 have the same actual deflection angles relative to the initial state.

Figure 9A:
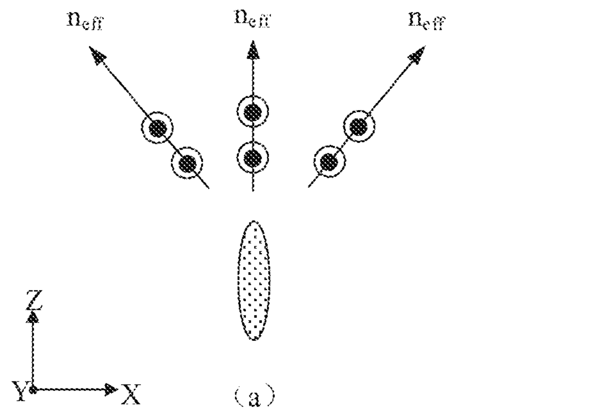
FIG. 9A is a schematic diagram of change of equivalent refractive indexes of liquid crystal molecules as change of a horizontal viewing angle.
Figure 9B:
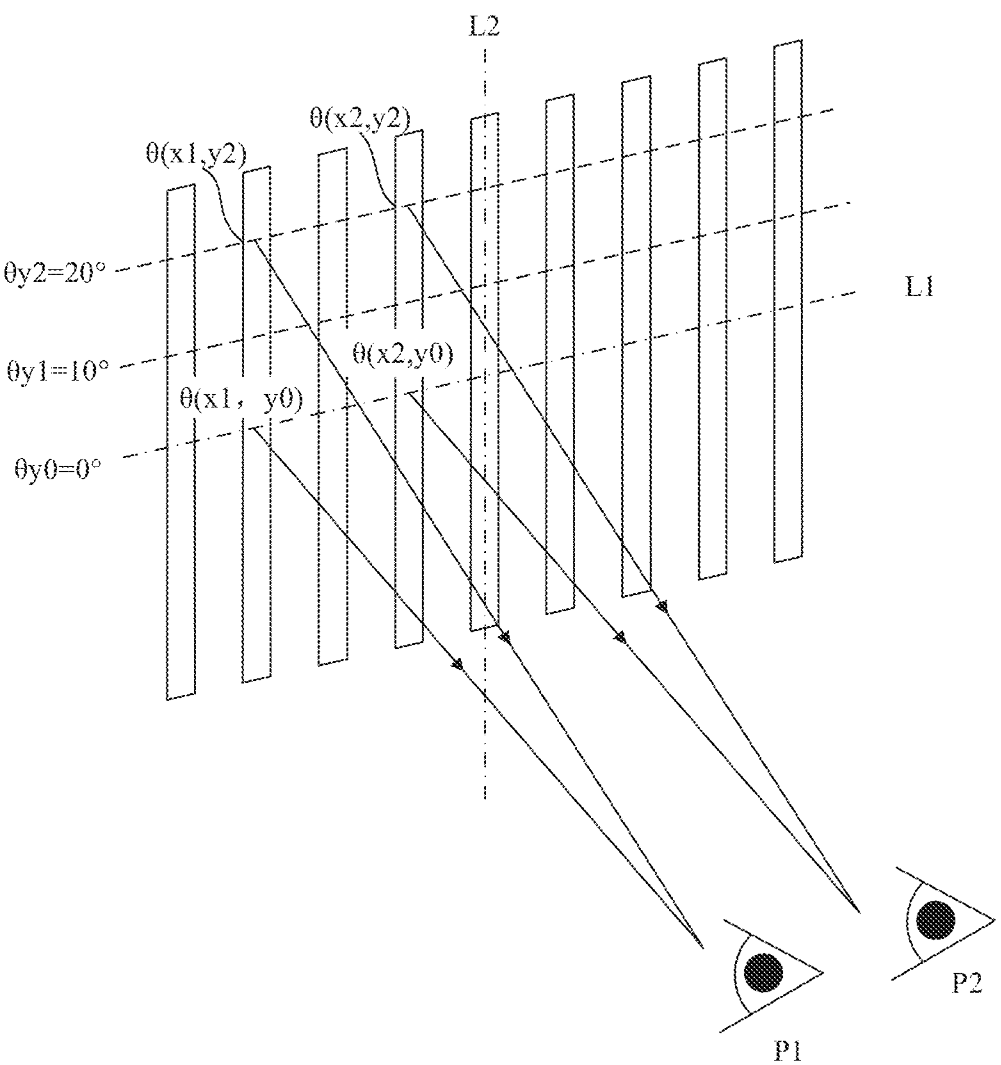
FIG. 9B is a schematic diagram of coordinates of different viewing angles when human eyes are at different positions in the related art.
Figure 9C:
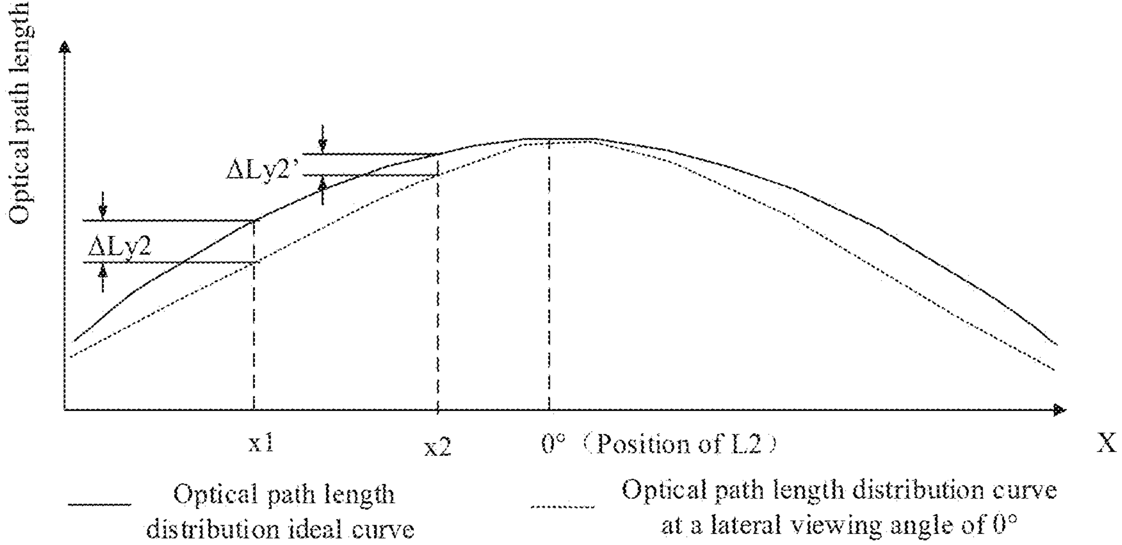
FIG. 9C is a comparison diagram between an optical path length distribution ideal curve and an optical path length distribution curve of a liquid crystal lens at a horizontal viewing angle of 0°.

FIG. 9A is a schematic diagram of change of equivalent refractive indexes of liquid crystal molecules as change of a horizontal viewing angle. FIG. 9B is a schematic diagram of coordinates of different viewing angles when human eyes are at different positions in the related art. FIG. 9C is a comparison diagram between an optical path length distribution ideal curve and an optical path length distribution curve of a liquid crystal lens at a horizontal viewing angle of 0°.

Due to the relatively large size of the display device, the vertical viewing angle changes when human eyes look down or look up at the display area. As the vertical viewing angle changes, the optical path length distribution curve of the liquid crystal lens will also change.

Referring to FIG. 9A, the refractive index of the liquid crystal molecule 41 is anisotropic. That is, the liquid crystal molecules 41 have two refractive indexes in optics, namely: a refractive index ($n_o$) for ordinary rays in the long axis direction and a refractive index ($n_e$) for extraordinary ray in the short axis direction. Referring to (a) in FIG. 9A, as the horizontal viewing angle changes, the incident light polarized along the second direction Y exhibit unchanged equivalent refractive index in liquid crystal molecule 41. Referring to (b) in FIG. 9A, for the incident light polarized along the second direction Y, when the light in other directions (not along the long axis direction and the short axis direction of the liquid crystal molecule) passes through the liquid crystal molecules 41, the equivalent refractive index $n_{eff}$ exhibited by the liquid crystal molecules 41 is greater than $n_e$ and less than $n_o$. Correspondingly, the ordinary light in the long axis direction has the smallest optical path length through the liquid crystal molecules 41, the extraordinary light in the short axis direction has the largest optical path length through the liquid crystal molecules 41, and the light in other directions has an optical path length between the two through the liquid crystal molecules 41.

Referring to FIGS. 9B and 9C, at the horizontal center line, the vertical viewing angle θy0-0°. Along the second direction Y from the horizontal center line, the vertical viewing angle θy gradually increases. For example, θy1=10°, θy2=20°. When the human eye is at a vertical viewing angle θy0=0°, the corresponding optical path length distribution curve is close to an optical path length distribution ideal curve. In a case of the horizontal viewing angle being 0°, the optical path length distribution curve of the liquid crystal lens is drawn.

At a position of x1 (a coordinate in the first direction X is x1), $$\Delta L_{y2} = \left| L_{\theta_{y2}=0^\circ} - L_{\theta_{y2}=20^\circ} \right|.$$

Where $L_{\theta y2=0^\circ}$ represents a distance from an ordinate corresponding to an abscissa x1 to the X-axis in the optical path length distribution ideal curve, and $L_{\theta y2=0^\circ}$ represents a distance from an ordinate corresponding to an abscissa x1 to the X-axis in the optical path length distribution curve of the liquid crystal lens drawn in a case of the horizontal viewing angle being 0°, and $\Delta L_{y2}$ represents a difference between the two distances.

At a position of x2 (a coordinate in the first direction X is x2), $$\Delta L'_{y2} = \left| L'_{\theta_{y2}=0^\circ} - L'_{\theta_{y2}=20^\circ} \right|.$$

Where $L_{\theta y2}=0^\circ$ represents a distance from an ordinate corresponding to an abscissa x2 to the X-axis in the optical path length distribution ideal curve, and $L_{\theta y2=20^\circ}$ represents a distance from an ordinate corresponding to an abscissa x2 to the X-axis in the optical path length distribution curve of the liquid crystal lens drawn in a case of the horizontal viewing angle being 0°, and $\Delta L_{y2}'$ represents a difference between the two distances. $\Delta L_{y2}$ and $\Delta L_{y2}'$ are not equal.

In this way, the optical path length distribution curve at the vertical viewing angle of 0° and the optical path length distribution curve at the vertical viewing angle of 20° have different shapes (e.g., different degree of curvature). The optical path length distribution curve at the vertical viewing angle of 0° is close to the optical path length distribution ideal curve, and the optical path length distribution curve at the vertical viewing angle of 20° is significantly different from the optical path length distribution ideal curve, resulting in poor display effects. Of course, such problems also exist at the vertical viewing angle of other non-zero angles.

Figure 10:
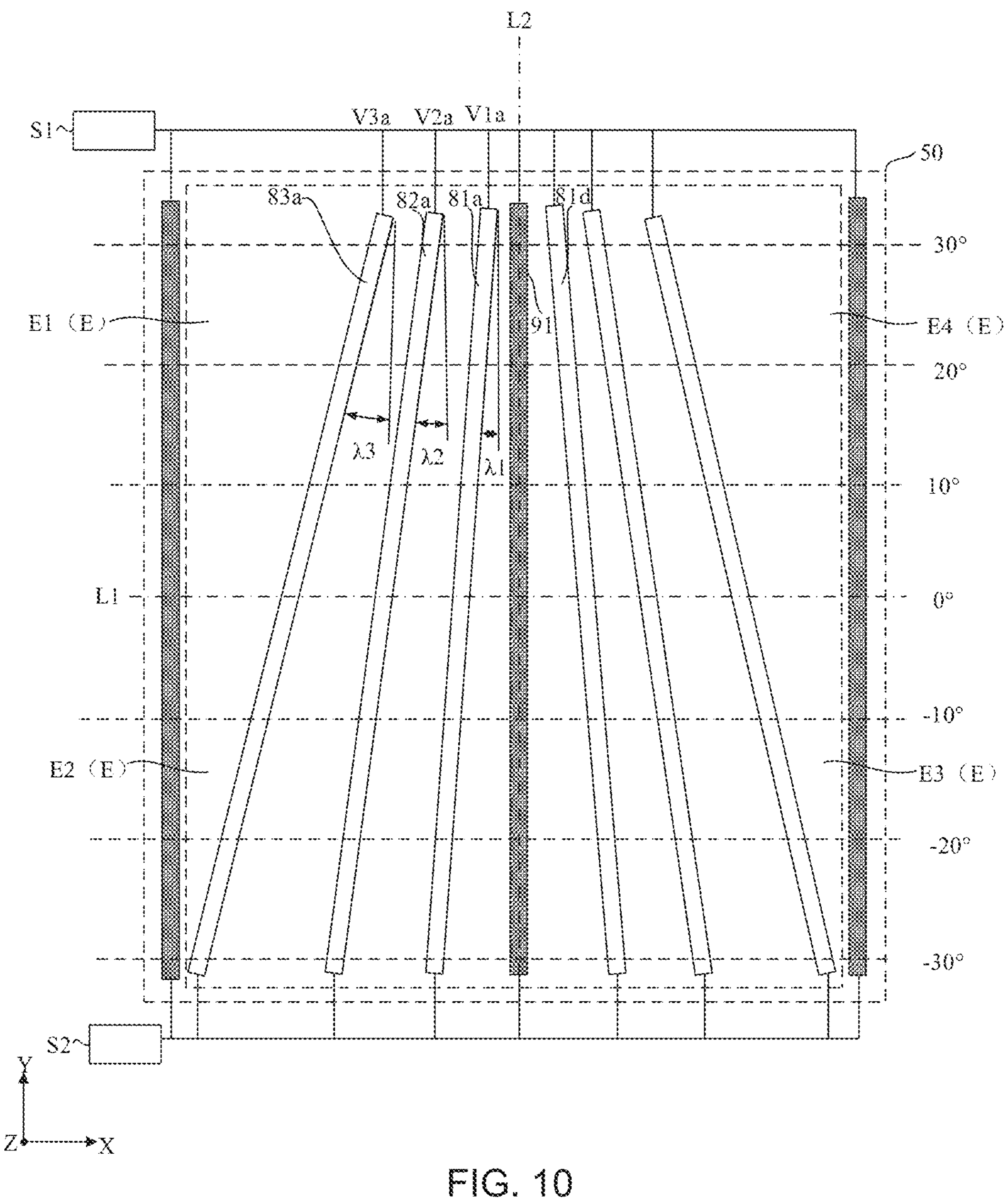
FIG. 10 is a structural diagram of a second electrode layer provided by embodiments of the present disclosure.

FIG. 10 is a structural diagram of a second electrode layer provided by embodiments of the present disclosure.

Referring to FIG. 10, the horizontal center line L1 and the vertical center line L2 of the liquid crystal lens 100 divide the second electrode layer 50 into a plurality of (e.g., four) electrode groups E. In the third direction Z, the electrode groups E correspond to the dimming areas D. For example, the plurality of electrode groups E are in one-to-one correspondence to the plurality of light dimming areas D, and each electrode group E is located within a corresponding light dimming area D. For example, the electrode group E includes a first electrode group E1, a second electrode group E2, a third electrode group E3 and a fourth electrode group E4, which respectively correspond to the first dimming area D1, the second dimming area D2, the third dimming area D3 and the fourth dimming area D4. The first electrode group E1 and the second electrode group E2 are located on the same side of the vertical center line L2, and the third electrode group E3 and the fourth electrode group E4 are located on the other side of the vertical center line L2. The first electrode group E1 and the fourth electrode group E4 are located on the same side of the horizontal center line L1, and the second electrode group E2 and the third electrode group E3 are located on the other side of the horizontal center line L1.

In some other implementations, the number of the electrode groups E may be less than the number of the dimming areas D, and each electrode group E corresponds to a dimming area D.

Figure 11:
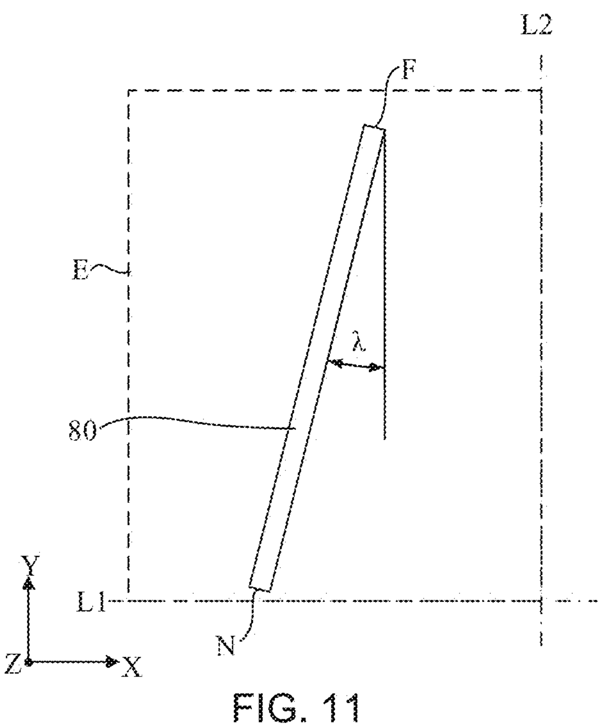
FIG. 11 is a structural diagram of a driving electrode provided by embodiments of the present disclosure.

FIG. 11 is a structural diagram of a driving electrode provided by embodiments of the present disclosure.

For facilitating description of the following contents, referring to FIG. 11, an end of a driving electrode 80 in the electrode group E away from the horizontal center line L1 is a distal end F of the driving electrode, and an end of the driving electrode 80 proximate to the horizontal center line L1 is a proximal end N of the driving electrode.

In the text, an electrode group with a specific electrode structure is called a specific electrode group, and an electrode group without such a specific electrode structure is called a non-specific electrode group. The electrode group with the specific electrode structure refers to, with continued reference to FIG. 10, in a direction away from the vertical center line L2 in the first direction, tilt angles A of the plurality of driving electrodes gradually increase. The tilt angle λ of the driving electrode 80 is an included angle (e.g., an acute angle) between an extending direction of the driving electrode 80 and the second direction Y. The extending direction of the driving electrode 80 is a direction of a line for connecting the proximal end N to the distal end F of the driving electrode 80.

There is at least one specific electrode group, and there may be zero non-specific electrode groups. Specifically, the number of specific electrode group(s) in the first electrode group E1, the second electrode group E2, the third electrode group E3 and the fourth electrode group E4 may be one, two, three or four; and accordingly, the number of non-specific electrode group(s) is three, two, one or zero. For example, with continued reference to FIG. 10, the first electrode group E1, the second electrode group E2, the third electrode group E3 and the fourth electrode group E4 are specific electrode groups. In the direction away from the vertical center line L2 in the first direction, the first electrode group E1 includes a driving electrode 81*a*, a driving electrode 82*a* and a driving electrode 83*a*. The tilt angle of the driving electrode 81*a* is $\lambda_1$, the tilt angle of the driving electrode 82*a* is $\lambda_2$, the tilt angle of the driving electrode 83*a* is $\lambda_3$, and $\lambda_1$ is less than $\lambda_2$ and $\lambda_2$ is less than $\lambda_3$ ($\lambda_1<\lambda_2<\lambda_3$). Similarly, in the direction away from the vertical center line L2 in the first direction, tilt angles of driving electrodes in the second electrode group E2, tilt angles of driving electrodes in the third electrode group E3, and tilt angles of driving electrodes in the fourth electrode group E4 increase sequentially. As another example, the first electrode group E1 is a specific electrode group, and the second electrode group E2, the third electrode group E3 and the fourth electrode group E4 are non-specific electrode groups.

The driving electrodes in the non-specific electrode group may be arranged at even intervals, and the embodiments of the present disclosure do not limit arrangement of the driving electrodes in the non-specific electrode group. The extending direction of the driving electrodes in the non-specific electrode group may be parallel to the vertical center line L2 or may be in any other direction.

In some embodiments, each driving electrode is connected to a signal line, and a plurality of signal lines are connected to a signal source. For example, the driving electrode 81*a* is connected to a signal line, the signal line is connected to a first signal source S1, and a transmission voltage signal is V1*a*. Similarly, in the direction away from the vertical center line L2 in the first direction, voltage signals of the driving electrodes 81*a*, 82*a* and 83*a* in the first electrode group E1 may be V1*a*, V2*a*, and V3*a*. In FIG. 10, Via, V2*a*, and V3*a* are only illustrative examples of different electrical signals applied by different driving electrodes, and are not limitations on the present disclosure. For the voltage signals of the second electrode group E2, the third electrode group E3, and the fourth electrode group E4, reference may be made to the above description of the first electrode group E1, and details are not repeated here. The electrode groups E located on the same side of the horizontal center line L1 may share a signal source. For example, the first electrode group E1 and the fourth electrode group E4 share the first signal source S1, each driving electrode in the first electrode group E1 and the fourth electrode group E4 is connected to a respective signal line, and these signal line are all connected to the first signal source. The second electrode group E2 and the third electrode group E3 may share a second signal source S2.

Figure 12:
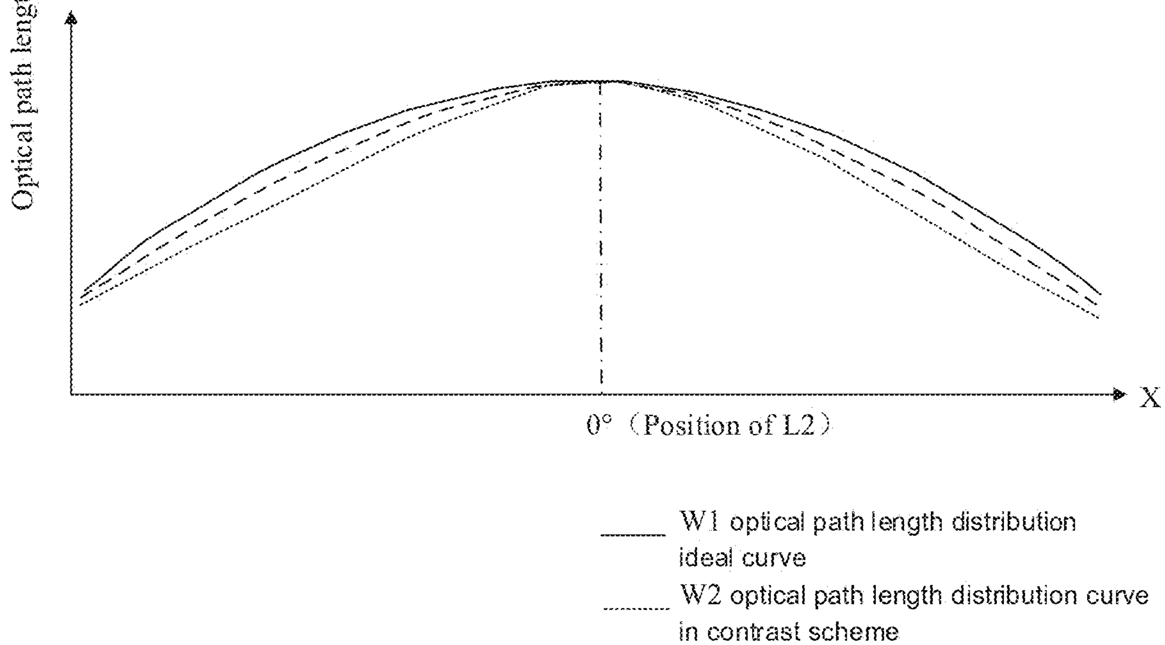
FIG. 12 is a comparison curve chart of optical path length distribution of a liquid crystal lens provided by embodiments of the present disclosure.

FIG. 12 is a comparison curve chart of optical path length distribution of a liquid crystal lens provided by embodiments of the present disclosure.

Referring to FIG. 12, W1 is an optical path length distribution ideal curve, W2 is an optical path length distribution curve in a comparative solution, and W3 is an optical path length distribution curve in the embodiments of the present disclosure. The comparative solution is a liquid crystal lens with the driving electrode arrangement as shown in FIG. 8. Compared with deflection angles of the liquid crystal molecules in the comparative solution, the embodiments of the present disclosure change distribution of an electric field between the first electrode layer and the second electrode layer by changing the arrangement of the driving electrodes in the specific electrode group. The tilt angles of the driving electrodes in the specific electrode group gradually increase in the direction away from the vertical center line L2 in the first direction, causing the deflection angles of the liquid crystal molecules to gradually change. At the same positions (the same coordinates in the first direction X) of the liquid crystal lens, W3 has a smaller deviation to W1 than to W2. Thus, the optical path length distribution curve may maintain a parabolic shape within a large viewing angle range, thereby reducing deflection of light. In this way, in the pixels covered by a liquid crystal lens 100, more light from the left eye display unit enters the left eye, and more light from the right eye display unit enters the right eye, thereby reducing crosstalk, improving image definition, and improving the 3D display effect.

Figure 13A:
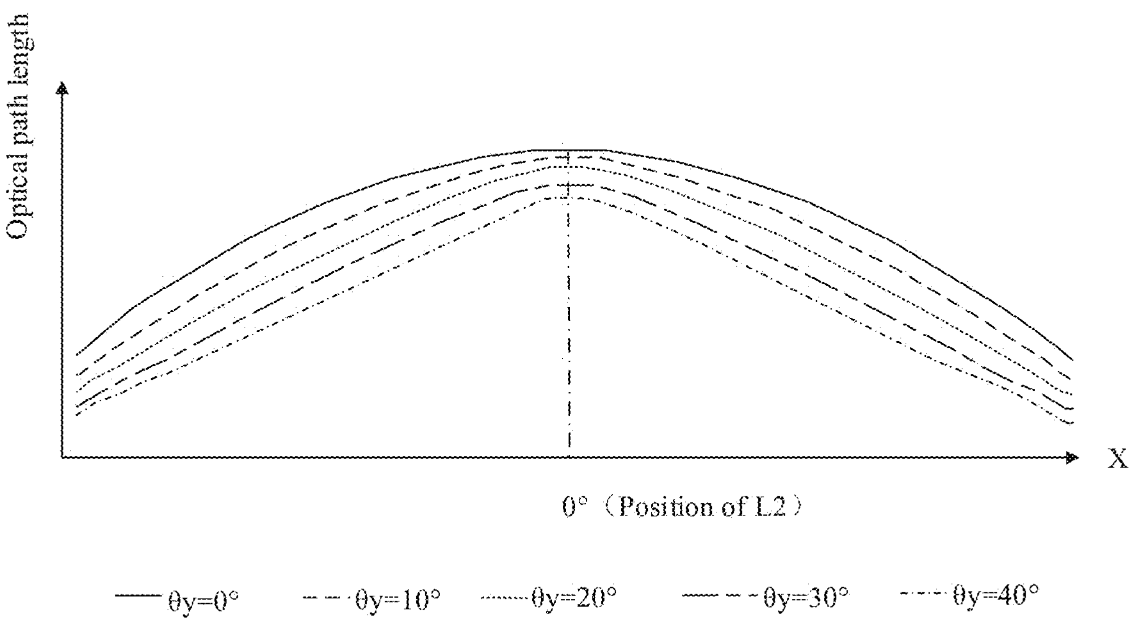
FIG. 13A is an optical path length distribution curve of a liquid crystal lens provided by embodiments of the present disclosure at a horizontal viewing angle of 0° when viewed downwards.
Figure 13B:
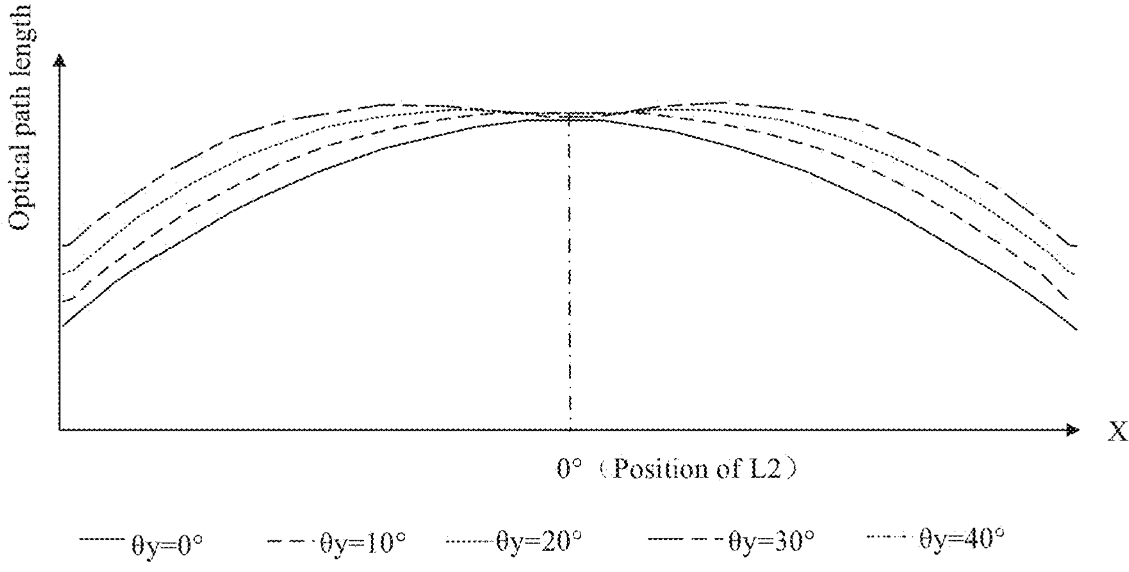
FIG. 13B is an optical path length distribution curve of a liquid crystal lens provided by embodiments of the present disclosure at a horizontal viewing angle of 0° when viewed upwards.

FIG. 13A is an optical path length distribution curve of a liquid crystal lens provided by embodiments of the present disclosure at a horizontal viewing angle of 0° when viewed downwards. FIG. 13B is an optical path length distribution curve of a liquid crystal lens provided by embodiments of the present disclosure at a horizontal viewing angle of 0° when viewed upwards.

With continued reference to FIG. 10, when the human eye looks down at the liquid crystal lens, as an absolute value of the vertical viewing angle gradually increases, a spacing between driving electrodes in the first direction X increases compared with the comparative solution, the intensity of the electric field between these driving electrodes decreases, the deflection angle of the liquid crystal molecules becomes smaller, and the optical path length becomes smaller. For example, as shown in FIG. 13A, an optical path length distribution curve at the vertical viewing angle of 0° (at the front viewing angle in this case) is close to the optical path length distribution ideal curve; an optical path length at the position of the same coordinate in the first direction X at the vertical viewing angle of 10° is less than the optical path length at the front viewing angle; similarly, optical path lengths at the positions of the same coordinates in the first direction X at the vertical viewing angles of 20°, 30° and 40° gradually decrease. However, in this case, the optical path length distribution curve is still in an arch shape, which is close to the arch shape of the optical path length distribution ideal curve. Moreover, as shown in FIG. 13A, within a range of the vertical viewing angle of 30°, the optical path length distribution curve and the optical path length distribution ideal curve have a close curve shape and small deviation.

With continued reference to FIG. 10, when the human eye looks up at the liquid crystal lens, as an absolute value of the vertical viewing angle gradually increases, a spacing between driving electrodes in the first direction X decreases compared with the comparative solution, the intensity of the electric field between these driving electrodes increases, the deflection angle of the liquid crystal molecules becomes larger, and the optical path length becomes larger. For example, as shown in FIG. 13B, an optical path length distribution curve at the vertical viewing angle of 0° (at the front viewing angle in this case) is close to the optical path length distribution ideal curve; an optical path length at the position of the same coordinate in the first direction X at the vertical viewing angle of −10° is greater than the optical path length at the front viewing angle; similarly, optical path lengths at the positions of the same coordinates in the first direction X at the vertical viewing angles of −20°, −30° and −40° gradually increase. At a curve corresponding to the coordinate in the first direction X where the driving electrodes do not gather, the optical path length distribution curve may still maintain a parabolic shape, which is close to the curve shape of the optical path length distribution ideal curve.

In some embodiments, with continued reference to FIG. 10, the liquid crystal lens 100 further includes a center electrode 91. A straight line where the center electrode 91 is located coincides with the vertical center line L2. The center electrode 91 is formed between the first electrode group E1 and the second electrode group E2, and the first electrode group E1 and the second electrode group E2 are located on two sides of the vertical center line L2. It is assumed that the center electrode 91 does not exist, the same voltages may be applied to a driving electrode 81*a* closest to the vertical center line L2 in the first electrode group E1 and a driving electrode 81*d* closest to the vertical center line L2 in the fourth electrode group E4, that is, the two has no voltage difference, and then the electric field generated between each of the two and the first electrode layer 50 have the same intensity. In this case, an area between the two cannot form an electric field with gradient intensity. After the center electrode 91 is provided, an electric field is generated between the center electrode 91 and the first electrode group E1, and an electric field is generated between the center electrode 91 and the fourth electrode group E4. An electric field with gradient intensity is generated in the area between the first electrode group E1 and the fourth electrode group E4, thereby be conducive to reducing deviation between the optical path length distribution curve and the optical path length distribution ideal curve, reducing deflection of the light of the liquid crystal lens 100, reducing crosstalk, and enhancing the three-dimensional display effect.

Figure 14:
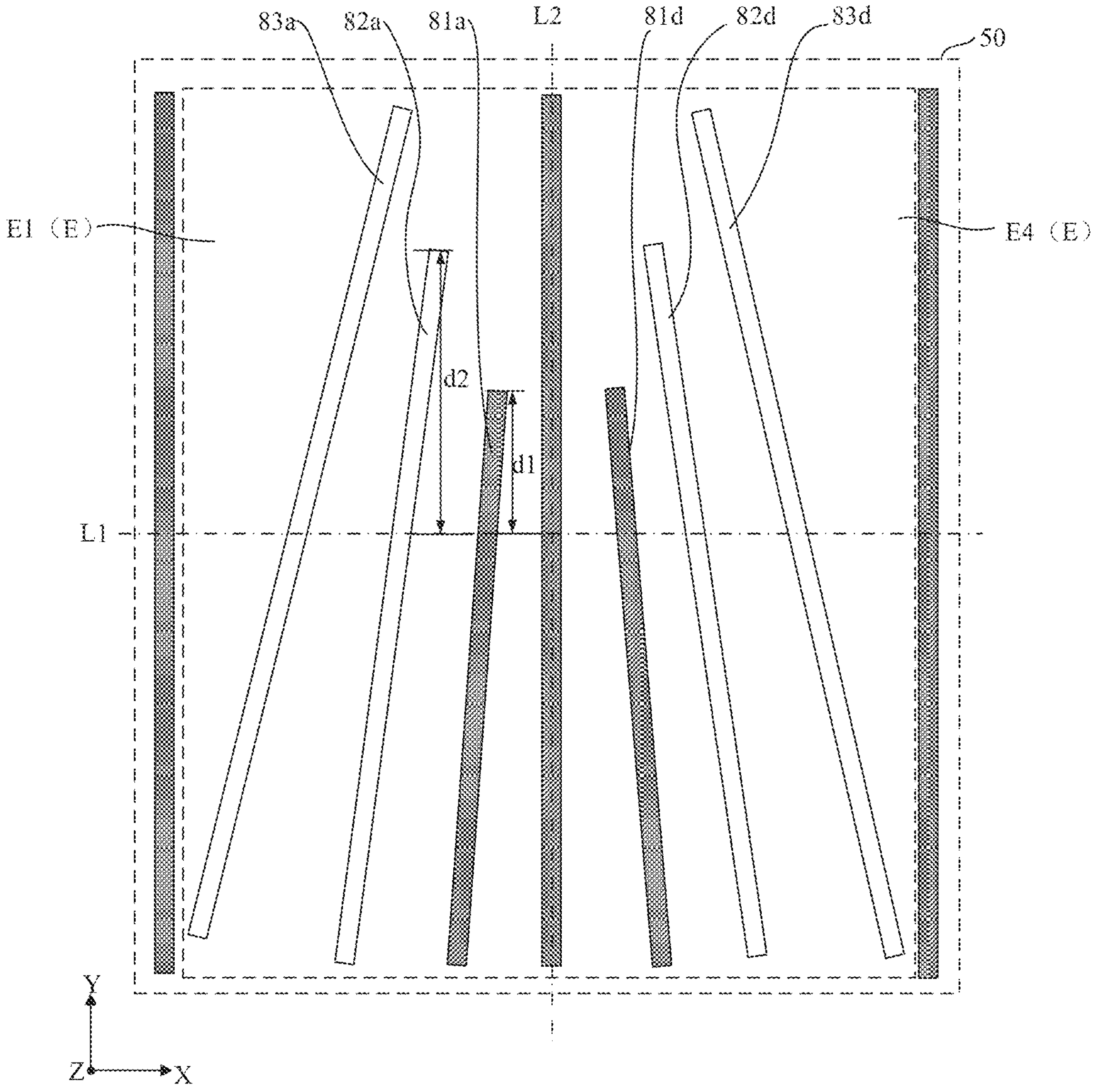
FIG. 14 is a structural diagram of another second electrode layer provided by embodiments of the present disclosure.

FIG. 14 is a structural diagram of another second electrode layer provided by embodiments of the present disclosure.

In some embodiments, in the direction away from the vertical center line L2 in the first direction, distal ends of a plurality of (e.g., two or all) driving electrodes in the specific electrode group are closer to the vertical center line L2 than proximal ends thereof. The closer to the vertical center line L2, the smaller the distance between the distal end of the driving electrode and the horizontal center line L1. Specifically, the specific electrode group includes a first driving electrode and a second driving electrode. The first driving electrode is further away from the vertical center line L2 than the second driving electrode. For example, referring to FIG. 14, the first electrode group E1 is a specific electrode group. In the direction away from the vertical center line L2 in the first direction, the first electrode group E1 includes a driving electrode 81*a*, a driving electrode 82*a*, and a driving electrode 83*a* in sequence. The driving electrode 82*a* is used as the first driving electrode, and the driving electrode 81*a* is used as the second driving electrode. The distal end of the driving electrode 82*a* is closer to the vertical center line L2 than the proximal end thereof, and the distal end of the driving electrode 81*a* is closer to the vertical center line L2 than the proximal end thereof. The driving electrode 82*a* is further away from the vertical center line L2 than the driving electrode 81*a*. A distance d2 between the distal end of the driving electrode 82*a* and the horizontal center line L1 is greater than a distance d1 between the distal end of the driving electrode 81*a* and the horizontal center line L1. As another example, with continued reference to FIG. 14, the first electrode group E1 is a specific electrode group. In the direction away from the vertical center line L2 in the first direction, the first electrode group E1 includes a driving electrode 81*a*, a driving electrode 82*a*, and a driving electrode 83*a* in sequence. A distance between the distal end of the driving electrode 83*a* and the horizontal center line L1 is greater than a distance d2 between the distal end of the driving electrode 82*a* and the horizontal center line L1, and the distance d2 between the distal end of the driving electrode 82*a* and the horizontal center line L1 is greater than a distance d1 between the distal end of the driving electrode 81*a* and the horizontal center line L1. As another example, the first electrode group E1 and the fourth electrode group E4 are specific electrode groups. In the first electrode group E1, a distance d2 between the distal end of the driving electrode 82*a* and the horizontal center line L1 is greater than a distance d1 between the distal end of the driving electrode 81*a* and the horizontal center line L1. In the fourth electrode group E4, a distance between the distal end of the driving electrode 82*d* and the horizontal center line L1 is greater than a distance between the distal end of the driving electrode 81*d* and the horizontal center line L1.

Since the tilt angles of the driving electrodes in the specific electrode group gradually increase in the direction away from the vertical center line L2 in the first direction, the plurality of driving electrodes extend to an area near the vertical center line L2, so that the driving electrodes proximate to the vertical center line L2 are arranged too densely and cannot be arranged at intervals. Therefore, by limiting the distances between the ends of the driving electrodes proximate to the vertical center line L2 and the horizontal center line L1, the lengths of the driving electrodes are reduced, so that the driving electrodes proximate to the vertical center line L2 may not be too dense and facilitate arrangement.

Figure 15:
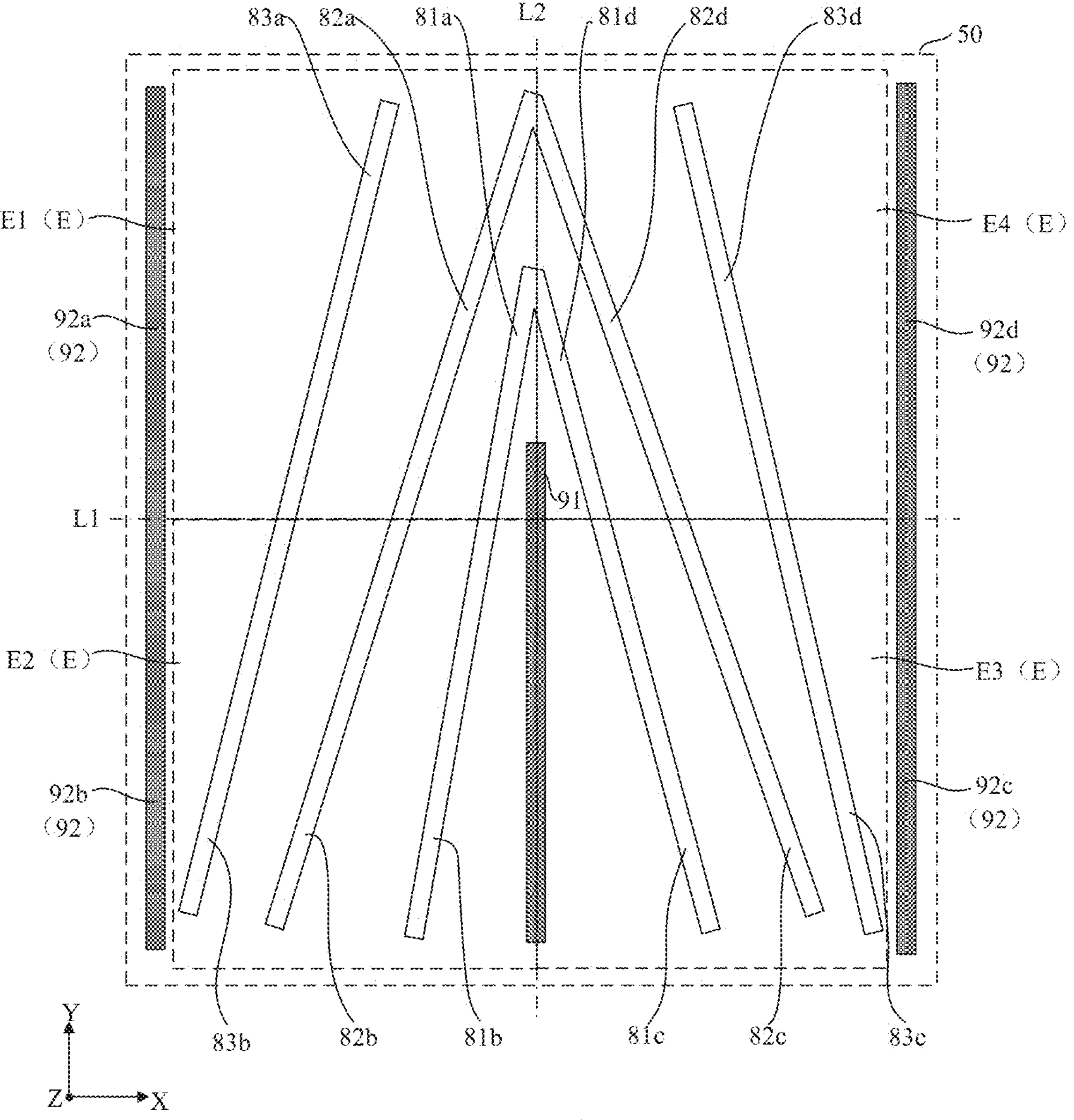
FIG. 15 is a structural diagram of yet another second electrode layer provided by embodiments of the present disclosure.

FIG. 15 is a structural diagram of yet another second electrode layer provided by embodiments of the present disclosure.

In some embodiments, a distal end of at least one (e.g., one or more) driving electrode in a specific electrode group is located on the vertical center line L2. For example, referring to FIG. 15, the first electrode group E1 is used as a specific electrode group, the driving electrode 82*a* is used as the first driving electrode, and the driving electrode 81*a* is used as the second driving electrode. A distal end of the driving electrode 81*a* closest to the vertical center line L2 in the first electrode group E1 is located on the vertical center line L2, and a distal end of the driving electrode 82*a* secondarily closest to the vertical center line L2 may also be located on the vertical center line L2. In order not to be connected to the driving electrode(s) located on the vertical center line L2, the center electrode 91 is provided away from the distal end of the driving electrode 81*a*. In the embodiments of the present disclosure, the distal end(s) of the driving electrode(s) in the specific electrode group are located on the vertical center line L2, so as to prevent ends of the plurality of driving electrodes proximate to the vertical center line L2 from being arranged too densely.

In some embodiments, at least one driving electrode in one of two specific electrode groups is respectively connected to at least one driving electrode in another of the two specific electrode groups, and the two specific electrode groups are located on both sides of the vertical center line L2. With continued reference to FIG. 15, the first electrode group E1 is a third specific electrode group, and the fourth electrode group E4 is a fourth specific electrode group. At least one driving electrode in the first electrode group E1 is connected to at least one driving electrode in the fourth electrode group E4. For example, the two connected driving electrodes have the same orders in respective electrode groups E. The distal end of the driving electrode 81*a* in the first electrode group E1 is connected to the distal end of the driving electrode 81*d* in the fourth electrode group E4, and the connecting point is located on the vertical center line L2. Thus, the driving electrode 81*a* and the driving electrode 81*d* are connected be presented as a "V" shape. The distal end of the driving electrode 82*a* in the first electrode group E1 is connected to the distal end of the driving electrode 82*d* in the fourth electrode group E4, and the connecting point is located on the vertical center line L2. Thus, the driving electrode 82*a* and the driving electrode 82*d* are connected to be presented as a "V" type. As another example, the two connected driving electrodes have different orders in respective electrode groups E. For example, the driving electrode 81*a* in the first electrode group E1 is connected to the driving electrode 82*d* in the fourth electrode group E4.

The two driving electrodes are connected to form a whole driving electrode. Since the whole driving electrode has approximately equal values of voltages at both ends thereof, a voltage needs to be applied only to any end (e.g., the proximal end of the driving electrode 81*a* or the proximal end of the driving electrode 81*d*) of the two connected driving electrodes that is not connected. For example, after the distal end of the driving electrode 81*a* and the distal end of the driving electrode 81*d* are connected on the vertical center line L2, the proximal end of the driving electrode 81*a* and the proximal end of the driving electrode 81*d* have approximately equal values of voltages. Therefore, a voltage may be applied only to the proximal end of the driving electrode 81*a*, or the voltage may be applied only to the proximal end of the driving electrode 81*d*. In this way, the number of signal lines and the number of signal sources are reduced. Of course, the voltages of the same magnitudes may be applied to both the proximal end of the driving electrode 81*a* and the proximal end of the driving electrode 81*d*, so as to reduce an influence of impedance caused by excessively long electrode.

In some embodiments, with continued reference to FIG. 15, all driving electrodes in a specific electrode group are located on the same side of the vertical center line L2, that is, all the driving electrodes in the specific electrode group do not cross over the vertical center line L2. For example, the first electrode group E1 is a specific electrode group, distal ends and proximal ends of all driving electrodes in the first electrode group E1 are located on the same side of the vertical center line L2 (there may be an end of the driving electrode on the vertical center line L2), and all the driving electrodes do not extend to the other side of the vertical center line L2. If an distal end of any driving electrode in the first electrode group E1 crosses over the vertical center line L2, arrangement of the driving electrodes in the fourth electrode group E4 may be disturbed, and distribution of the electric field of the fourth electrode group E4 may further be disturbed, so that deviation of the optical path length distribution curve of the liquid crystal lens corresponding to the fourth electrode group E4 increases, resulting in rather serious deflection of the light, and in turn affecting the accuracy of the displayed image and making 3D crosstalk rather obvious. All the driving electrodes in the first electrode group E1 do not cross over the vertical center line L2 to extend to the fourth electrode group E4, and thus distribution of the electric fields corresponding to the specific electrode groups on both sides of the vertical center line L2 may not be affected. As a result, the optical path length distribution curve of the liquid crystal lens corresponding to the fourth electrode group E4 has a small deviation, so that the accuracy of the displayed image may not be affected.

In Table 1, the comparative solution is a liquid crystal lens with the driving electrode arrangement as shown in FIG. 8, the first solution is a liquid crystal lens with driving electrode arrangement as shown in FIG. 14, and the second solution is a liquid crystal lens with driving electrode arrangement as shown in FIG. 15.

The first solution and the second solution are optimized driving electrode arrangement solutions. Table 1 shows simulation results of focal lengths and fitting deviation (PV) of the liquid crystal lenses 100 formed with three driving electrode arrangement solutions. It can be seen from Table 1, the optimized driving electrode arrangement solution slightly changes the focal length, and the influence caused by changes of the focal length may be compensated through 3D image algorithm. The optimized driving electrode arrangement solution further reduces the PV value of the liquid crystal lens 100 in most cases, that is, the deviation value of the optical path length distribution curve fitting shape of the liquid crystal lens 100 may be reduced, and the degree of deflection of the light may be reduced, so that the image from the left eye display unit enters the left eye, and the image from the right eye display unit enters the right eye. Thus, the display device 1000 has a rather clear image, and the 3D display effect is rather good.

TABLE 1

Comparison of simulation results of three solutions

| | Comparative solution | | First solution | | Second solution | |
|---|---|---|---|---|---|---|
| θy | Focal length | PV value | Focal length | PV value | Focal length | PV value |
| 0 | 729 | 2.60% | 729 | 2.64% | 729 | 2.64% |
| 10 | 686 | 8.40% | 699 | 5.76% | 699 | 5.76% |
| 20 | 688 | 13.70% | 671 | 6.50% | 671 | 6.50% |
| 30 | 673 | 18.80% | 662 | 6.97% | 662 | 6.97% |
| −10 | 807 | 7.30% | 859 | 4.30% | 859 | 4.30% |
| −20 | 920 | 15.50% | 1019 | 10.50% | 1019 | 8.20% |
| −30 | 1065 | 29.80% | 1272 | 35.50% | 1239 | 17.40% |

It can also be seen from Table 1 that in a case where the positions of the driving electrodes are the same and the driving voltages are the same, when the vertical viewing angle θy is any of 10°, 20° and 30°, the first solution and the second solution have the same simulation results, and the optical path length distribution curve fitting shape of the liquid crystal lens is rather accurate; and when the vertical viewing angle θy is any of −30°, −20° and −10°, especially when the absolute value of the vertical viewing angle when looking up is greater than 20°, the liquid crystal lens 100 in the second solution has a smaller focal length and a lower PV value, and the optical path length distribution curve fitting shape of the liquid crystal lens 100 is better.

With continued reference to FIGS. 13A to 15, a distance between driving electrodes located at the lower side of the horizontal center line L1 is greater than a distance between driving electrodes at the upper side of the horizontal center line L1. In this way, the electric field distribution at the lower side is more dispersed than the electric field distribution at the upper side. Compared with the comparative solution, at the positions with the same coordinates in the first direction X, driving electrodes at the upper half of the second electrode layer are arranged more densely. The position with more dense arrangement of the driving electrodes has a stronger electric field, the liquid crystal molecules have larger deflection angles, and the optical path length is larger. Thus, the optical path length distribution curve at a downward viewing angle may be caused to be a nearly arch-shaped curve. When viewed upwards, the distal ends of the driving electrodes are close to the vertical center line L2, so that the intensity of the electric field at a position near a horizontal viewing angle of 0° is too large, causing the deflection angle of the liquid crystal molecules to be too large, and the optical path length is reduced instead.

Figure 16A:
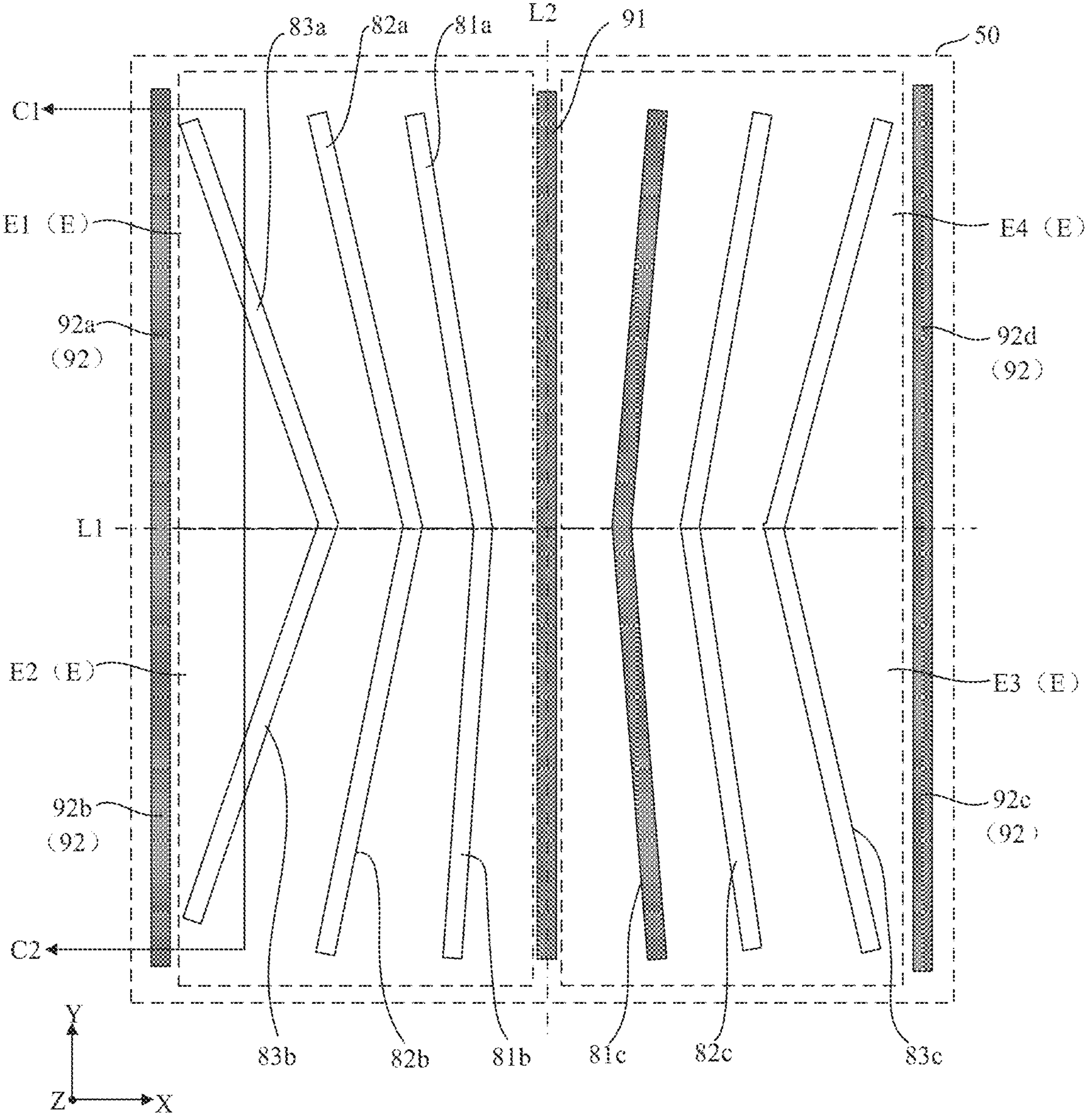
FIG. 16A is a structural diagram of yet another second electrode layer provided by embodiments of the present disclosure.
Figure 16B:
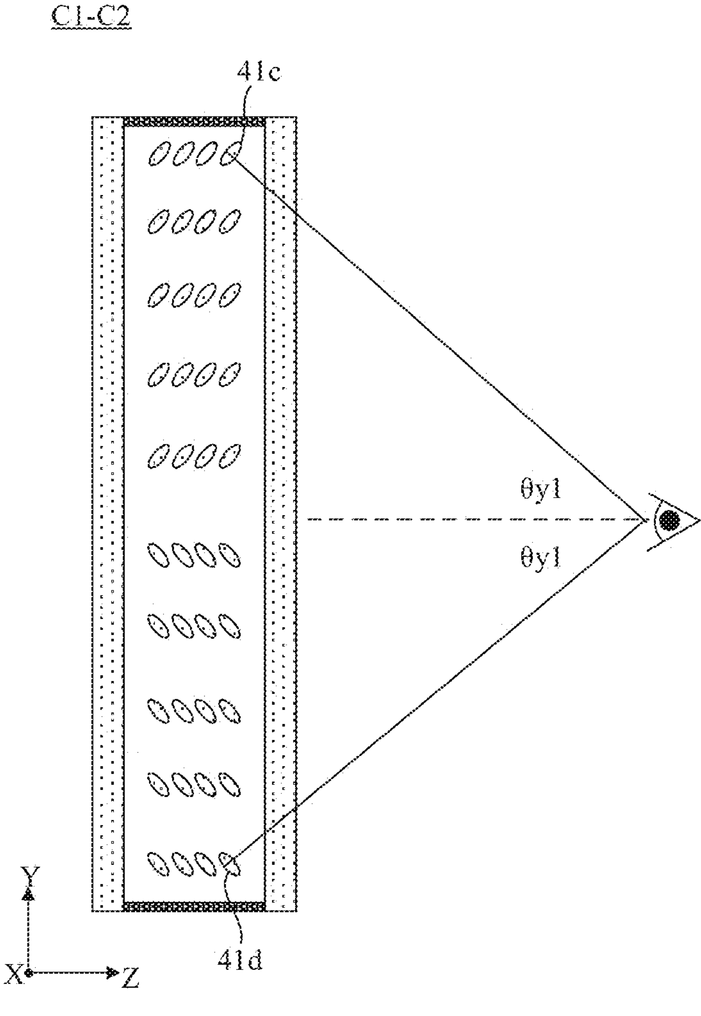
FIG. 16B is a sectional view taken along a section line C1-C2 in FIG. 16A.

FIG. 16A is a structural diagram of yet another second electrode layer provided by embodiments of the present disclosure. FIG. 16B is a sectional view taken along a section line C1-C2 in FIG. 16A.

In order to make the optical path length distribution curve fitting shape of the liquid crystal lens accurate at the downward and upward viewing angles, in some embodiments, for two specific electrode groups located on the same side of the vertical center line L2, the distal ends of the driving electrodes are further away from the vertical center line L2 than the proximal ends thereof. For example, referring to FIG. 16A, the first electrode group E1 is used as a first specific electrode group, and the second electrode group E2 is used as a second specific electrode group. The distal ends of the driving electrode 81*a*, the driving electrode 82*a* and the driving electrode 83*a* in the first electrode group E1 is further away from the vertical center line L2 than the proximal ends thereof, and the distal ends of the driving electrode 81*b*, the driving electrode 82*b* and the driving electrode 83*b* in the second electrode group E2 are further away from the vertical center line L2 than the proximal ends thereof. As another example, the distal ends of all the driving electrodes in the first electrode group E1, the second electrode group E2, the third electrode group E3 and the fourth electrode group E4 are further away from the vertical center line L2 than the proximal ends thereof.

With continued reference to FIG. 16B, the pretilt angles of the liquid crystal molecules 41 in the liquid crystal layer 40 corresponding to the first electrode group E1 and the pretilt angles of the liquid crystal molecules in the liquid crystal layer 40 corresponding to the second electrode group E2 are in opposite directions. For the light exiting through the liquid crystal molecules 41*c* in the first electrode group E1, the vertical viewing angle for the human eye is θy1, and the equivalent refractive index of the liquid crystal molecules 41*c* is n1. For the light exiting through the liquid crystal molecules 41*d* in the second electrode group E2, the vertical viewing angle for the human eye is θy2, and the equivalent refractive index of the liquid crystal molecules 41*d* is n2. Since the liquid crystal molecules 41*c* and the liquid crystal molecules 41*d* have opposite pretilt angles, the liquid crystal molecules 41*c* and the liquid crystal molecules 41*d* have opposite deflection directions. In addition, compared with the comparative solution, the distribution spacing of the driving electrodes at the positions corresponding to the liquid crystal molecules 41*c* and the liquid crystal molecules 41*d* is no smaller than that in the first solution and the second solution. The equivalent refractive index n1 of the liquid crystal molecules 41*c* is approximately the same as the equivalent refractive index n2 of the liquid crystal molecules 41*d*. The optical path length distribution curves of all liquid crystal lenses at the same vertical viewing angle as the liquid crystal molecules 41*c* are approximately the same as the optical path length distribution curves of all liquid crystal lenses at the same vertical viewing angle as the liquid crystal molecules 41*d*, that is, the liquid crystal lenses, with the same absolute values of the vertical viewing angles, located on both sides of the horizontal center line L1 have approximately the same optical path length distribution curves. Furthermore, at the positions with the same coordinates in the first direction X, portions of the liquid crystal lens with the same absolute values of the vertical viewing angles have small deflection degree of light.

With continued reference to Table 1, the simulation results in a case of looking downwards are better than the simulation results in a case of looking upwards. That is, the fitting shape of the optical path length distribution curve of the liquid crystal lens 100 at a downward viewing angle is better than the fitting shape of the optical path length distribution curve of the liquid crystal lens 100 at an upward viewing angle. With continued reference to FIG. 16A, the first electrode group E1 and the second electrode group E2 both refer to the driving electrode arrangement structure in a case of looking downwards in FIG. 10, and the maximum PV value is less than 7%. The third electrode group E3 and the fourth electrode group E4 still maintain the driving electrode arrangement structure at the downward viewing angle in FIG. 10. Since the upper half area is symmetrical to the lower half area, looking up at the upper half area is actually equivalent to looking down at the lower half area, and the fitting shapes of the optical path length distribution curves of the upper and lower parts are accurate, the optical path length distribution curve is close to the optical path length distribution ideal curve, and the deflection degree of light is small, thereby effectively improving the influence of 3D crosstalk at a large viewing angle.

In some embodiments, with continued reference to FIG. 16A, two specific electrode groups located on the same side of the vertical center line L2 are axially symmetrical about the horizontal center line L1. For example, the first electrode group E1 is used as the first specific electrode group, and the second electrode group E2 is used as the second specific electrode group. The first electrode group E1 and the second electrode group E2 are axially symmetrical about the horizontal center line L1. The proximal ends of the driving electrodes in the first electrode group E1 and the second electrode group E2 are further away from the vertical center line L2 than the distal ends thereof. As another example, the third electrode group E3 and the fourth electrode group E4 are axially symmetrical about the horizontal center line L1. The upper and lower parts of the convex lens structure equivalent to the liquid crystal lens 100 are axially symmetrical about the horizontal center line. The driving electrodes in the specific electrode groups are axially symmetrically distributed on both sides of the horizontal center line L1, and the corresponding optical path length distribution curve fitting is rather accurate.

In some embodiments, for two specific electrode groups located on the same side of the vertical center line L2, a plurality of driving electrodes in a specific electrode group are respectively connected to a plurality of driving electrodes in another specific electrode group. For example, referring to FIG. 16A, the first electrode group E1 is a fifth specific electrode group, and the second electrode group E2 is a sixth specific electrode group. In a direction away from the vertical center line L2 in the first direction, the driving electrodes with the same orders in the first electrode group E1 and the second electrode group E2 are connected correspondingly. That is to say, the proximal end of the driving electrode 81*a* is connected to the proximal end of the driving electrode 81*b*, the proximal end of the driving electrode 82*a* is connected to the proximal end of the driving electrode 82*b*, and the proximal end of the driving electrode 83*a* is connected to the proximal end of the driving electrode 83*b*. For example, in a case where the driving electrode 81*a* and the driving electrode 81*b* are connected, the voltage may be applied only to the distal end of the driving electrode 81*a*, or the voltage may be applied only to the distal end of the driving electrode 81*b*. In this way, the number of signal lines and the number of signal sources may be reduced. Of course, the voltages of the same magnitudes may be applied to both the proximal end of the driving electrode 81*a* and the proximal end of the driving electrode 81*b*. In this way, the impedance problem caused by excessively long electrode may be solved. As an example, in the direction away from the vertical center line L2 in the first direction, the driving electrodes with different orders in the first electrode group E1 and the second electrode group E2 may be connected. For example, the driving electrode 81*a* is a driving electrode in the first electrode group E1 closet to the vertical center line L2, the driving electrode 82*b* is a driving electrode in the second electrode group E2 secondarily closest to the vertical center line L2, and the proximal end of the driving electrode 81*a* is connected to the proximal end of the driving electrode 82*b*.

Figure 17:
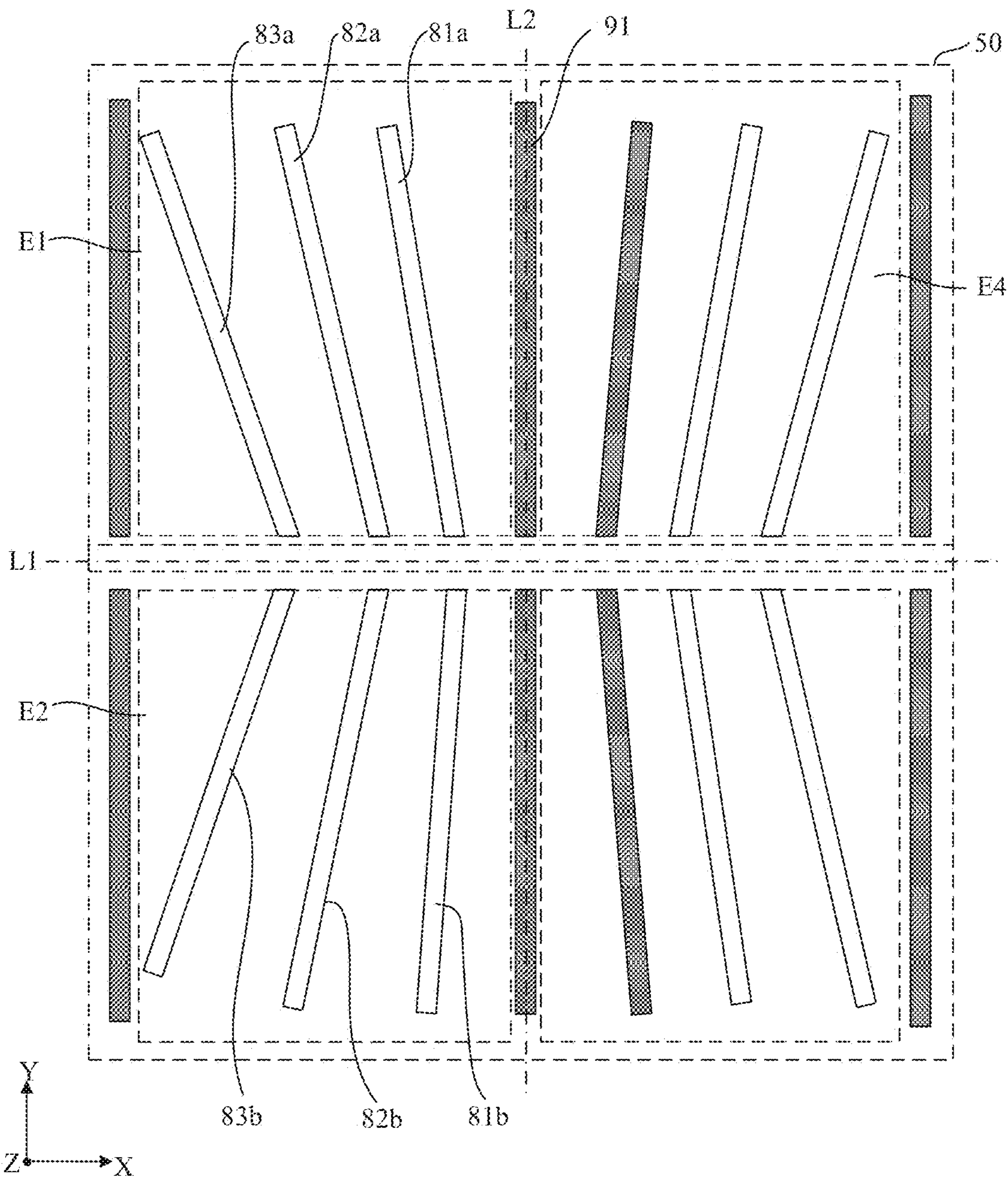
FIG. 17 is a structural diagram of yet another second electrode layer provided by embodiments of the present disclosure.

FIG. 17 is a structural diagram of yet another second electrode layer provided by embodiments of the present disclosure.

In some embodiments, for two specific electrode groups located on the same side of the vertical center line L2, all driving electrodes in a specific electrode group are insulated from all driving electrodes in another specific electrode group. For example, referring to FIG. 17, the first electrode group E1 is a fifth specific electrode group, and the second electrode group E2 is a sixth specific electrode group. All the driving electrodes 81*a*, 82*a* and 83*a* in the first electrode group E1 are not connected to all the driving electrodes 81*b*, 82*b* and 83*b* in the second electrode group E2.

In some embodiments, proximal ends of a plurality of driving electrodes in the specific electrode group have an equal spacing therebetween. The spacing refers to a distance between proximal ends of two adjacent driving electrodes. Specifically, with continued reference to FIG. 17, the first electrode group E1 is a specific electrode group. The proximal ends of the driving electrode 81*a*, the driving electrode 82*a* and the driving electrode 83*a* have an equal spacing therebetween. In addition, the connection lines between the proximal ends of the driving electrode 81*a*, the driving electrode 82*a* and the driving electrode 83*a* may also be parallel to (coincide with or not coincide with) the horizontal center line L1. The spacing between the driving electrode 81*a* and the center electrode 91 may be equal to the spacing between the proximal ends of two adjacent driving electrodes. In this way, any adjacent driving electrodes have an equal spacing, and the liquid crystal molecules have the same deflection angles. In the first direction X, since the intensity of the electric field decreases and then increases, the deflection angles of the liquid crystal molecules in the YZ plane decrease and then increase. At a vertical viewing angle of 0°, the optical path length distribution curve is an optical path length distribution ideal curve.

In some embodiments, two electrode groups located on the same side of the horizontal center line L1 are axially symmetrical about the vertical center line L2. For example, with continued reference to FIG. 17, the first electrode group E1 and the fourth electrode group E4 are axially symmetrical about the vertical center line L2. Correspondingly, the driving electrodes with the same orders corresponding to the first electrode group E1 and the fourth electrode group E4 are applied with the same voltages. In this way, the electric field is symmetrically distributed on both sides of the vertical center line L2, the liquid crystal molecules at the position corresponding to the vertical center line L2 have the same deflection angles, and the optical path length distribution curve is left-right symmetrical. The optical path length distribution ideal curve is also left-right symmetrical. In this way, there is small deviation between the optical path length distribution curve and the optical path length distribution ideal curve, and the formed equivalent convex lens structure meets the basic morphological requirements of left-right symmetry for liquid crystal lenses.

Figure 18:
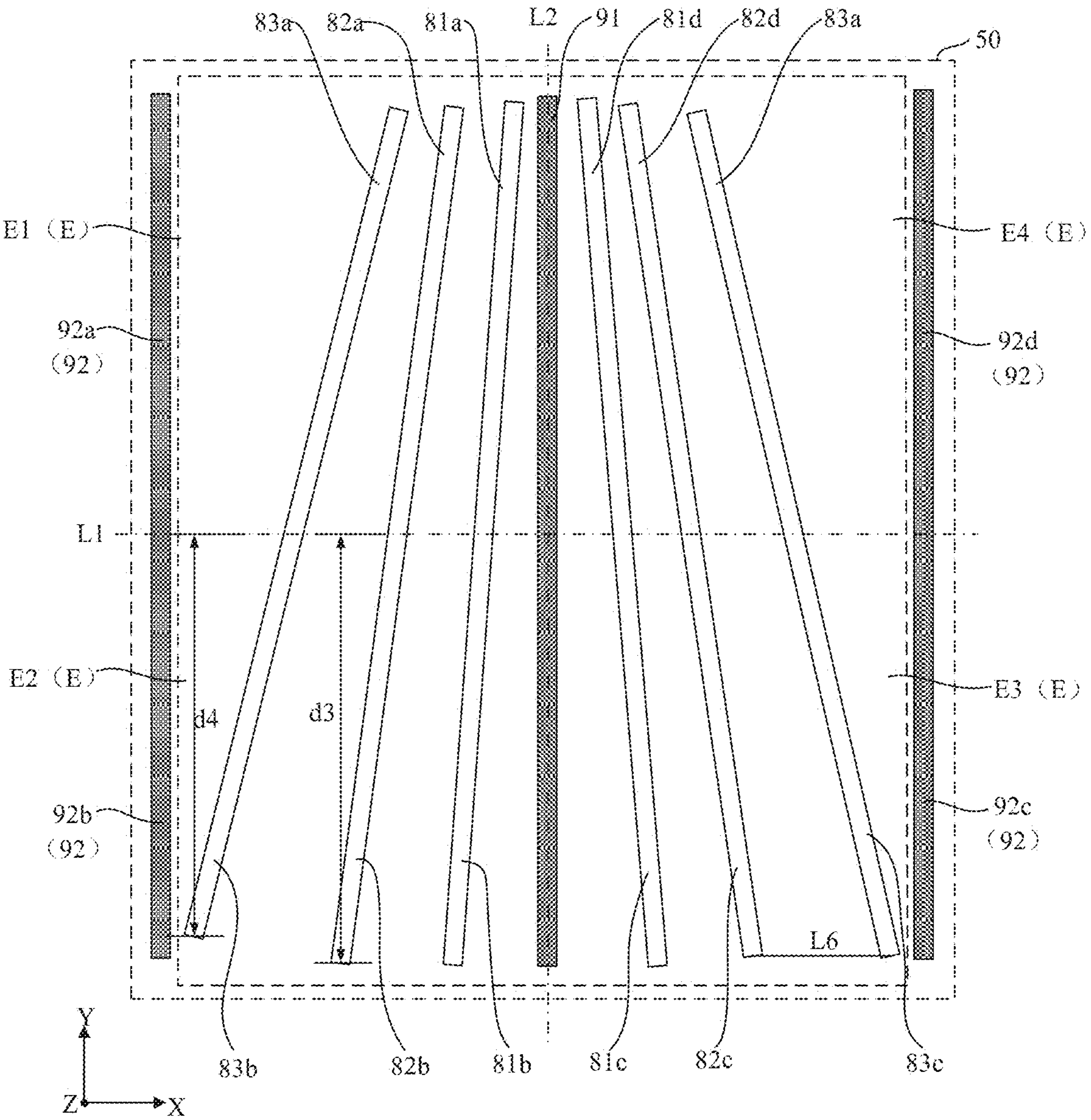
FIG. 18 is a structural diagram of yet another second electrode layer provided by embodiments of the present disclosure.

FIG. 18 is a structural diagram of yet another second electrode layer provided by embodiments of the present disclosure.

In some embodiments, referring to FIG. 18, the liquid crystal lenses 100 further includes a plurality of edge electrodes 92. The edge electrode 92 is located on a side of an electrode group E away from the vertical center line L2. The tilt angle of the edge electrode 92*a* may be smaller than the tilt angle of the driving electrode 83*a*. For example, the extending direction of the edge electrode 92 is parallel to the vertical center line L2. An edge electrode 92 is provided on a side of each electrode group E away from the vertical center line L2. For example, an edge electrode 92*a* is located on a side of the first electrode group E1 away from the vertical center line L2, and an edge electrode 92*b* is located on a side of the second electrode group E2 away from the vertical center line L2. As another example, an edge electrode 92*c* is located on a side of the third electrode group E3 away from the vertical center line L2, and an edge electrode 92*d* is located on a side of the fourth electrode group E4 away from the vertical center line L2. In some embodiments, the edge electrode 92*a* and the edge electrode 92*b* may be connected to form an integrated electrode (i.e., adjacent edge electrodes on both sides of the horizontal center line L1). In this way, the electric field on a side of the electrode group E away from the vertical center line L2 may be strengthened. In a case where the liquid crystal lenses are connected, the edge electrodes may enhance the electric field distribution between the electrode groups of adjacent liquid crystal lenses.

In some embodiments, with continued reference to FIG. 18, the specific electrode group (e.g., the second electrode group E2) includes a third driving electrode and a fourth driving electrode. The third driving electrode is further away from the edge electrode 92 than the fourth driving electrode. For example, the second electrode group E2 is a specific electrode group, the fourth driving electrode is a driving electrode 83*b* closest to the edge electrode 92, and the fourth driving electrode is adjacent to the third driving electrode. Of course, the fourth driving electrode may be another driving electrode, such as the driving electrode 82*b*. The driving electrode 82*b* is used as a third driving electrode, and the driving electrode 83*b* is used as a fourth driving electrode. The driving electrode 82*b* is further away from the edge electrode 92*b* than the driving electrode 83*b*. A distance d3 between a distal end of the driving electrode 82*b* and the horizontal center line L1 is greater than a distance d4 between a distal end of the driving electrode 83*b* and the horizontal center line L1, so as to prevent the driving electrodes in an area proximate to the edge electrode 92 from being too dense, thereby preventing the driving electrodes from being connected to the edge electrode and reducing the influence of the edge electrode on the electric field distribution of the electrode group.

In some embodiments, with continued reference to FIG. 18, a connection line of the distal end of the third driving electrode and the distal end of the fourth driving electrode is parallel to the horizontal center line L1. The connection line between the distal ends of the driving electrodes refers to a connection line between the centers of the distal ends of the driving electrodes. For example, the third electrode group E3 is used as a specific electrode group. The third electrode group E3 includes the driving electrode 81*c*, the driving electrode 82*c* and the driving electrode 83*c* in sequence in a direction away from the vertical center line L2 in the first direction X. An edge electrode 92*c* is provided on a side of the third electrode group E3 away from the vertical center line L2. The driving electrode 82*c* is used as the third driving electrode, and the driving electrode 83*c* is used as the fourth driving electrode. The driving electrode 82*c* is further away from the edge electrode 92*c* than the driving electrode 83*c*. A connection line L6 of the distal end of the driving electrode 82*c* and the distal end of the driving electrode 83*c* is parallel to the horizontal center line L1. The term "parallel" here means substantially parallelism. In some other implementations, the connection line of the distal ends of all the driving electrodes in the specific electrode group is parallel to the horizontal center line L1. The connection line of the distal ends of the plurality of driving electrodes in the specific electrode group is parallel to the horizontal center line L1, so that the driving electrodes may also be prevented from being too dense in an area proximate to the edge electrode.

In some embodiments, with continued reference to FIG. 18, multiple (e.g., two or all) driving electrodes in a specific electrode group are insulated from each other. For example, the first electrode group E1 is a specific electrode group, and the driving electrode 81*a*, the driving electrode 82*a* and the driving electrode 83*a* are insulated from each other. As another example, the first electrode group E1, the second electrode group E2, the third electrode group E3 and the fourth electrode group E4 are all specific electrode groups, and all driving electrodes in each electrode group are insulated from each other. The mutual insulation between the driving electrodes may reduce the influence of connection of the driving electrodes on the electric field distribution and reduce the deviation of the fitting shape of the liquid crystal lens 100.

In some embodiments, with continued reference to FIG. 18, the width of the driving electrode is equal everywhere, which has a simple design and facilitates production.

In some embodiments, with continued reference to FIG. 18, the shapes of the plurality of driving electrodes are straight strips.

Figure 19:
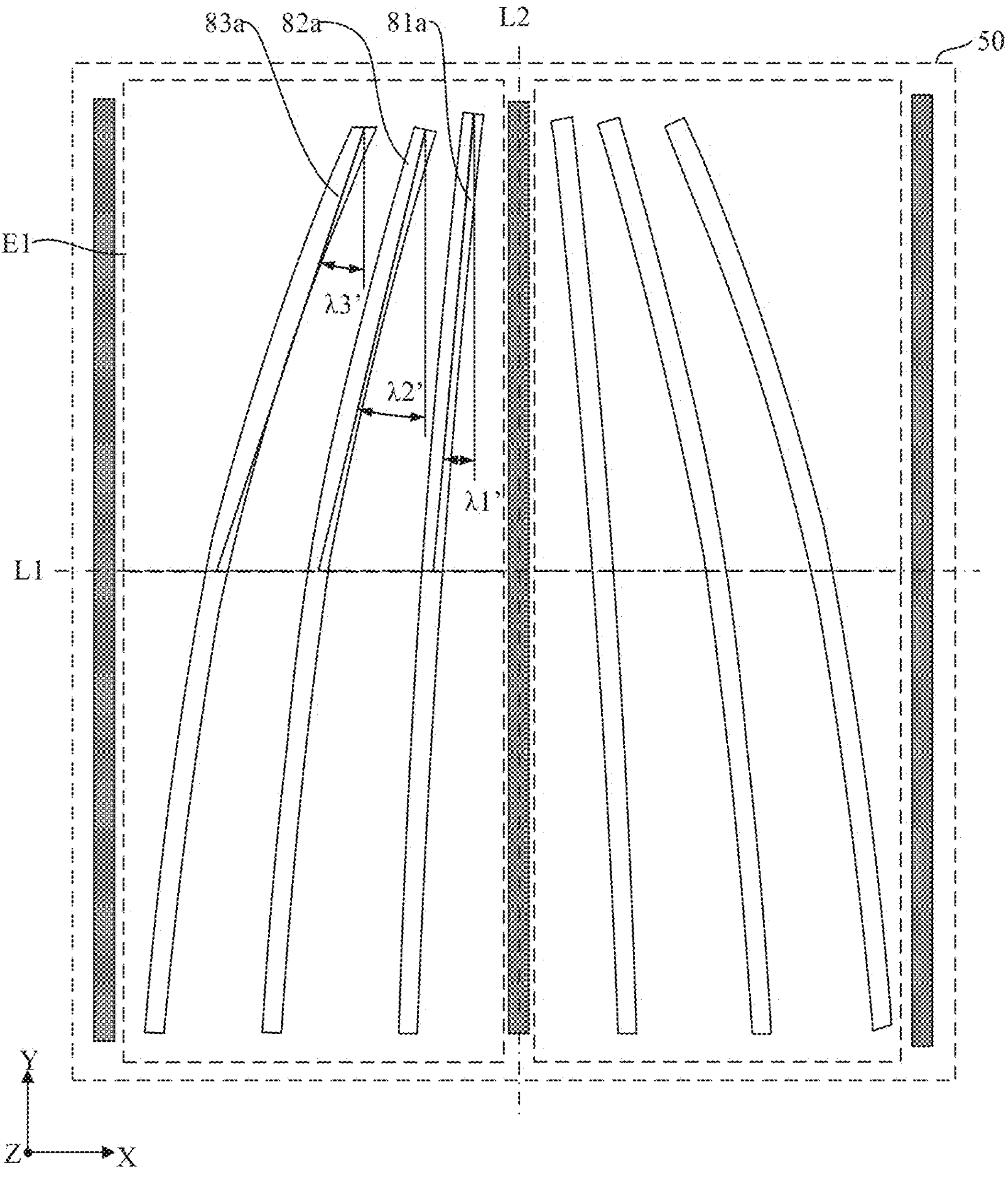
FIG. 19 is a structural diagram of yet another second electrode layer provided by embodiments of the present disclosure.

FIG. 19 is a structural diagram of yet another second electrode layer provided by embodiments of the present disclosure.

In some embodiments, referring to FIG. 19, the shapes of the plurality of driving electrodes are curves. For example, each driving electrode may be part of a circle, part of an elliptical pattern, or part of a parabolic pattern. The driving electrodes are convex in a direction away from the vertical center line L2 in the first direction, so that the electric field distribution is also convex in the direction away from the vertical center line L2 in the first direction. After the deflection of the liquid crystal molecules, the optical path length distribution curve of the liquid crystal lens and the optical path length distribution ideal curve have rather small deviation. Specifically, the curved driving electrodes may be driving electrodes in a specific electrode group or driving electrodes in a non-specific electrode group. For example, the first electrode group E1 is a specific electrode group, the tilt angles $\lambda$ of the driving electrode 81*a*, the driving electrode 82*a* and the driving electrode 83*a* gradually increases in the direction away from the vertical center line L2 in the direction, and $\lambda_1'$ is less than $\lambda_2'$ and $\lambda_2'$ is less than $\lambda_3'$ ($\lambda_1'<\lambda_2'<\lambda_3'$). The driving electrodes are in curved shapes, and the liquid crystal molecules are deflected due to action of the electric field generated by the curved driving electrodes, and the deviation between the formed optical path length distribution change and the optical path length distribution ideal curve becomes small.

Figure 20:
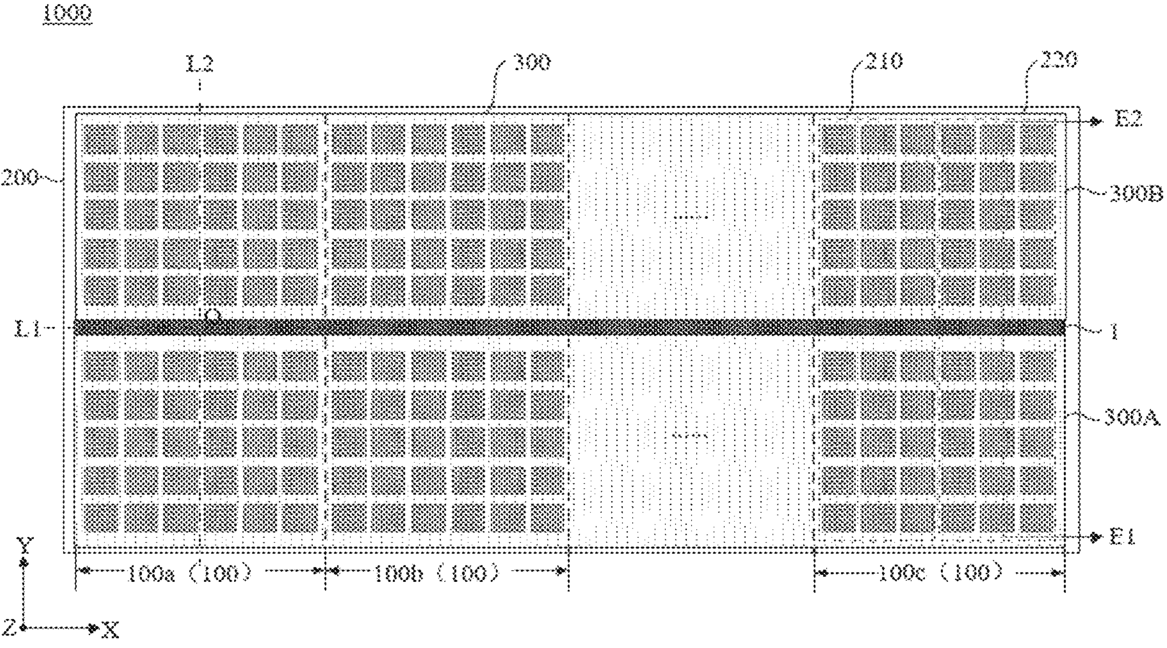
FIG. 20 is a top view of another display device provided by embodiments of the present disclosure.
Figure 21:
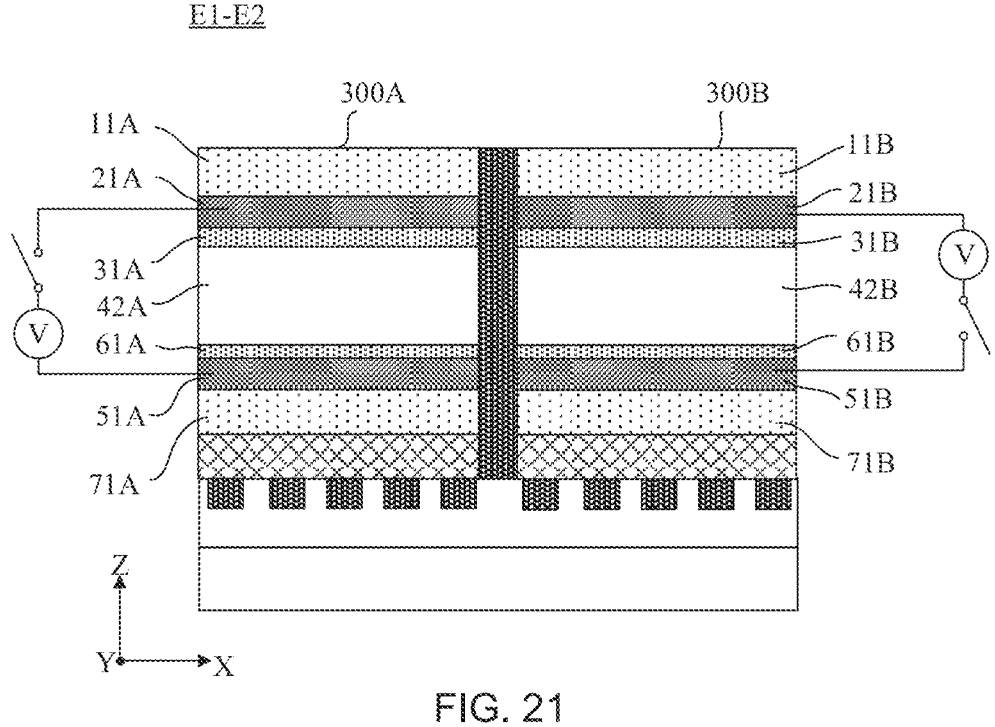
FIG. 21 is a sectional view taken along a section line E1-E2 in FIG. 20.

FIG. 20 is a top view of another display device provided by embodiments of the present disclosure. FIG. 21 is a sectional view taken along a section line E1-E2 in FIG. 20.

In some other embodiments, the lens module may be formed by tiling a plurality of (e.g., two) lens sub-modules together. The plurality of lens sub-modules are tiled into at least one (e.g., one or more) liquid crystal lenses. For example, referring to FIG. 20, the lens module 300 is tiled by a first lens sub-module 300A and a second lens sub-module 300B. The first lens sub-module 300A and the second lens sub-module 300B are tiled to at least form a first liquid crystal lens 100*a*, a second liquid crystal lens 100*b* and a third liquid crystal lens 100*c*. By considering the first liquid crystal lens 100*a* as an example, the first liquid crystal lens 100*a* is divided into four dimming areas by a horizontal center line L1 and a vertical center line L2. The horizontal center line L1 is a straight line passing through an optical center of the liquid crystal lens 100 and extending in the first direction X, and the vertical center line L2 is a straight line passing through the optical center of the liquid crystal lens 100 and extending in the second direction Y. The first direction and the second direction are perpendicular to each other. The third direction Z refers to the above description, and details are not repeated here. The horizontal center lines of all liquid crystal lenses overlap, and the vertical center lines of all liquid crystal lenses are parallel to each other. All the horizontal center lines and all the vertical center line divide the lens module 300 into M dimming areas in total, for example, M≥4.

The lens sub-module is an optical component that converges or diverging light by utilizing birefringence characteristics of liquid crystal molecules and characteristics of the liquid crystal molecules arranged with changes in electric field distribution. Each lens sub-module covers at least one (e.g., one or more) left eye display unit 210 and at least one (e.g., one or more) right eye display unit 220. The plurality of lens sub-modules are provided with voltages to cause the liquid crystal molecules in the plurality of lens sub-modules to be deflected to form a specific arrangement. Such specific arrangement makes the plurality of lens sub-modules equivalent to at least one convex lens. The liquid crystal lens is provided with a voltage to cause the liquid crystal molecules in the liquid crystal lens to be deflected to form a specific arrangement. Such specific arrangement makes the liquid crystal lens equivalent to a convex lens structure. When the display area AA of the display panel 200 performs display, light is emitted by the left eye display unit 210 and the right eye display unit 220 respectively, and then is refracted by the liquid crystal lens 100 to enter the eyes of the viewer. Although FIG. 14 shows a limited number of lens sub-modules, the number of the lens sub-modules is not limited.

Referring to FIG. 21, the first lens sub-module 300A includes a first sub-substrate 11A, a second sub-substrate 71A, a first electrode sub-layer 21A, a second electrode sub-layer 51A and a liquid crystal sub-layer 42A.

The first sub-substrate 11A and the second sub-substrate 71A are arranged opposite to each other. For materials, structures and thicknesses of the first sub-substrate 11A and the second sub-substrate 71A, reference may be made to the above introduction about the first substrate 10, and details are not repeated here.

The liquid crystal sub-layer 42A is disposed between the first sub-substrate 11A and the second sub-substrate 71A. The liquid crystal sub-layer 42A includes a plurality of liquid crystal molecules. These liquid crystal molecules may be distributed at a uniform density throughout an entire area of the liquid crystal sub-layer 42A. The initial orientation directions of all liquid crystal molecules are parallel to each other. Specifically, the orthographic projections of the liquid crystal molecules on the first sub-substrate 11A are parallel to each other. In the embodiments of the present disclosure, the initial orientation directions of the liquid crystal molecules 41 are along the second direction Y.

In some embodiments, the liquid crystal molecules 41 may also generate pretilt angles, and the pretilt angles of the liquid crystal molecules in the liquid crystal sub-layer 42A is positive. For example, the pretilt angle may be 2°.

The first electrode sub-layer 21A is disposed on a side of the liquid crystal sub-layer 42A. In the embodiments of the present disclosure, the first electrode sub-layer 21A is located between the first sub-substrate 11A and the liquid crystal sub-layer 42A. In the third direction Z, the first electrode sub-layer 21A corresponds to N dimming areas of the plurality of liquid crystal lenses 100 formed, $M \geq N \geq 1$. As shown FIG. 20, N is 4. Alternatively, N may be 8, 3 or 1. For the material of the first electrode sub-layer 21A, reference may be made to the description of the first electrode layer 20 above, and details are not repeated here.

The second electrode sub-layer 51A is disposed on a side of the liquid crystal sub-layer 42A away from the first electrode sub-layer 21A. In the embodiments of the present disclosure, the second electrode sub-layer 51A is located between the second sub-substrate 71A and the liquid crystal sub-layer 42A. The second electrode sub-layer 51A includes a row of driving electrodes arranged in the first direction X, and the driving electrodes are strip electrodes. Each driving electrode is connected to at least one signal line for applying a voltage to the driving electrode. For the material of the second electrode sub-layer 51A, reference may be made to the description of the second electrode layer 50 above, and details are not repeated here. The materials of the first electrode sub-layer 21A and the second electrode sub-layer 51A may be the same or different, which is not limited in the embodiments of the present disclosure. In another implementation, positions of the first electrode sub-layer 21A and the second electrode sub-layer 51A may be interchanged.

The second electrode sub-layer 51A includes electrode group(s) corresponding to each of the N dimming areas. The number of the dimming areas may be greater than the number of the electrode groups. For example, the second electrode sub-layer 51A includes two electrode groups, and the liquid crystal lens 100*a* includes four dimming areas. At least one of N electrode groups corresponding to the N dimming areas is a specific electrode group. In the specific electrode group, in a direction away from the vertical center line L2 in the first direction, tilt angles of the plurality of driving electrodes gradually increase.

Figure 22:
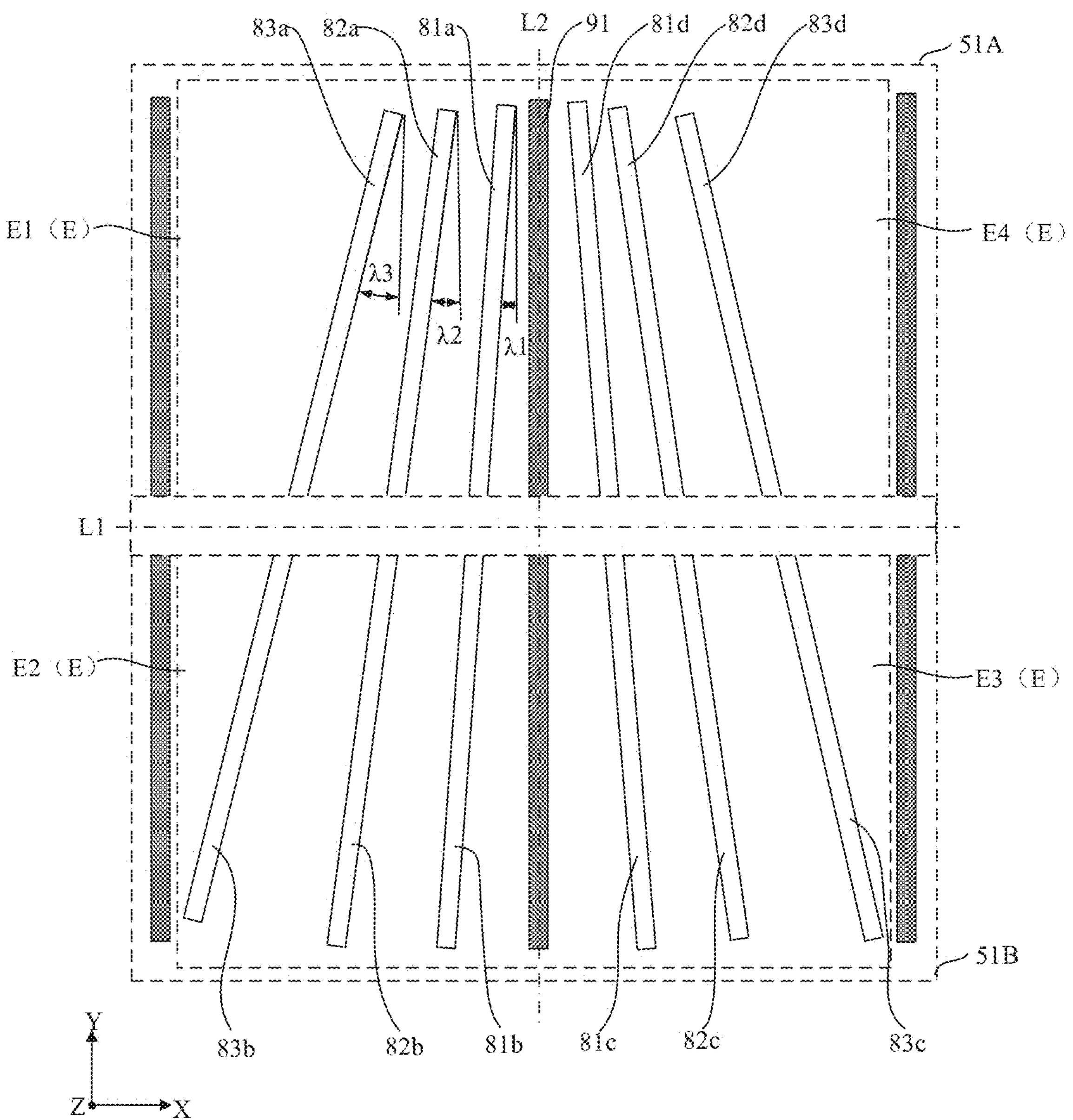
FIG. 22 is a partial structural diagram of second electrode sub-layers of a first lens sub-module and a second lens sub-module provided by embodiments of the present disclosure.

FIG. 22 is a partial structural diagram of second electrode sub-layers of a first lens sub-module and a second lens sub-module provided by embodiments of the present disclosure.

The liquid crystal lens forms N dimming areas. Referring to FIG. 22, the second electrode sub-layer 51A of the first lens sub-module includes a first electrode group E1 and a second electrode group E4. Taking the first electrode group E1 as a specific electrode group, in the direction away from the vertical center line L2 in the first direction, the driving electrodes in the first electrode group E1 include a driving electrode 81*a*, a driving electrode 82*a* and a driving electrode 83*a*. The tilt angle of the driving electrode 81*a* is $\lambda_1$, the tilt angle of the driving electrode 82*a* is $\lambda_2$, the tilt angle of the driving electrode 83*a* is $\lambda_3$, and $\lambda_1$ is less than $\lambda_2$ and $\lambda_2$ is less than $\lambda_3$ ($\lambda_1<\lambda_2<\lambda_3$). In some embodiments, the second electrode group E4 may also be a specific electrode group. The tilt angles of a driving electrode 81*d*, a driving electrode 82*d* and a driving electrode 83*d* gradually increase in the direction away from the vertical center line L2 in the first direction.

A plurality of lens sub-modules constitute at least one liquid crystal lens. The structure of each part of a liquid crystal lens constituted by the plurality of lens sub-modules may refer to the description of the liquid crystal lens 100 above, and details are not repeated here.

With continued reference to FIG. 21, the first electrode sub-layer 21A and the second electrode sub-layer 51A in the first lens sub-module 300A are provided with voltages thereto. A vertical electric field is generated between the first electrode sub-layer 21A and the second electrode sub-layer 51A, and the electric field drives the liquid crystal molecules to be deflected. The first electrode sub-layer 21B and the second electrode sub-layer 51B in the second lens sub-module 300B are provided with voltages thereto. A vertical electric field is generated between the first electrode sub-layer 21B and the second electrode sub-layer 51B, and the electric field drives the liquid crystal molecules to be deflected.

The first lens sub-module 300A further includes at least one alignment layer for guiding alignment directions of the liquid crystal molecules. The at least one alignment layer is disposed on a side or both sides of the liquid crystal sub-layer 42A, and may include any of a first alignment sub-layer 31A and a second alignment sub-layer 61A, or may include both the first alignment sub-layer 31A and the second alignment sub-layer 61A.

The initial orientation direction of the liquid crystal molecules proximate to the first alignment sub-layer 31A is parallel or approximately parallel to the alignment direction of the first alignment sub-layer 31A, and the initial orientation direction of the liquid crystal molecules proximate to the second alignment sub-layer 61A is parallel or approximately parallel to the alignment direction of the second alignment sub-layer 61A. For example, the alignment direction of the first alignment sub-layer 31A is parallel to the second direction Y, and the alignment direction of the second alignment sub-layer 61A is parallel to the second direction Y. On a basis of the alignment directions being determined, the pretilt angle of the liquid crystal molecule is an acute angle between the long axis of the liquid crystal molecule and the alignment direction. The extension direction of the long axis of the liquid crystal molecule is a direction after rotating the pretilt angle based on the initial orientation direction.

The second lens sub-module 300B includes a first sub-substrate 11B, a second sub-substrate 71B, a first electrode sub-layer 21B, a second electrode sub-layer 51B and a liquid crystal sub-layer 42B. For structures and materials of the first sub-substrate 11B, the second sub-substrate 71B, the first electrode sub-layer 21B, the second electrode sub-layer 51B and the liquid crystal sub-layer 42B, reference may be made to the description of the first lens sub-module 300A, and details are not repeated here.

The liquid crystal molecules in the liquid crystal sub-layer 42A of the first lens sub-module 300A and the liquid crystal molecules in the liquid crystal sub-layer 42B of the second lens sub-module 300B have the same initial orientation directions, and the pretilt angle directions may be the same or opposite. For example, the pretilt angles of the liquid crystal molecules in the liquid crystal sub-layer 42A of the first lens sub-module 300A is positive, and the pretilt angles of the liquid crystal molecules in the liquid crystal sub-layer 42B of the second lens sub-module 300B is negative.

A plurality of first sub-substrates 11A and 11B of the lens module 300 are connected together to form a large first substrate 10, and a plurality of second sub-substrates 71A and 71B are connected together to form a second substrate 70. A plurality of first electrode sub-layers 21A and 21B are connected together to form a first electrode layer 20, a plurality of liquid crystal sub-layers 42A and 42B are connected together to form a liquid crystal layer 40, and a plurality of second electrode sub-layers 51A and 51B are connected together to form a second electrode sub-layer 50. The first alignment sub-layers 31A and 31B are connected together to form a first alignment layer 30. The second alignment sub-layers 61A and 61B are connected together to form a second alignment layer 60. In some embodiments, the plurality of first sub-substrates 11A and 11B are disconnected and not connected together, and the plurality of second sub-substrates 71A and 71B may not be connected together.

Figure 23A:
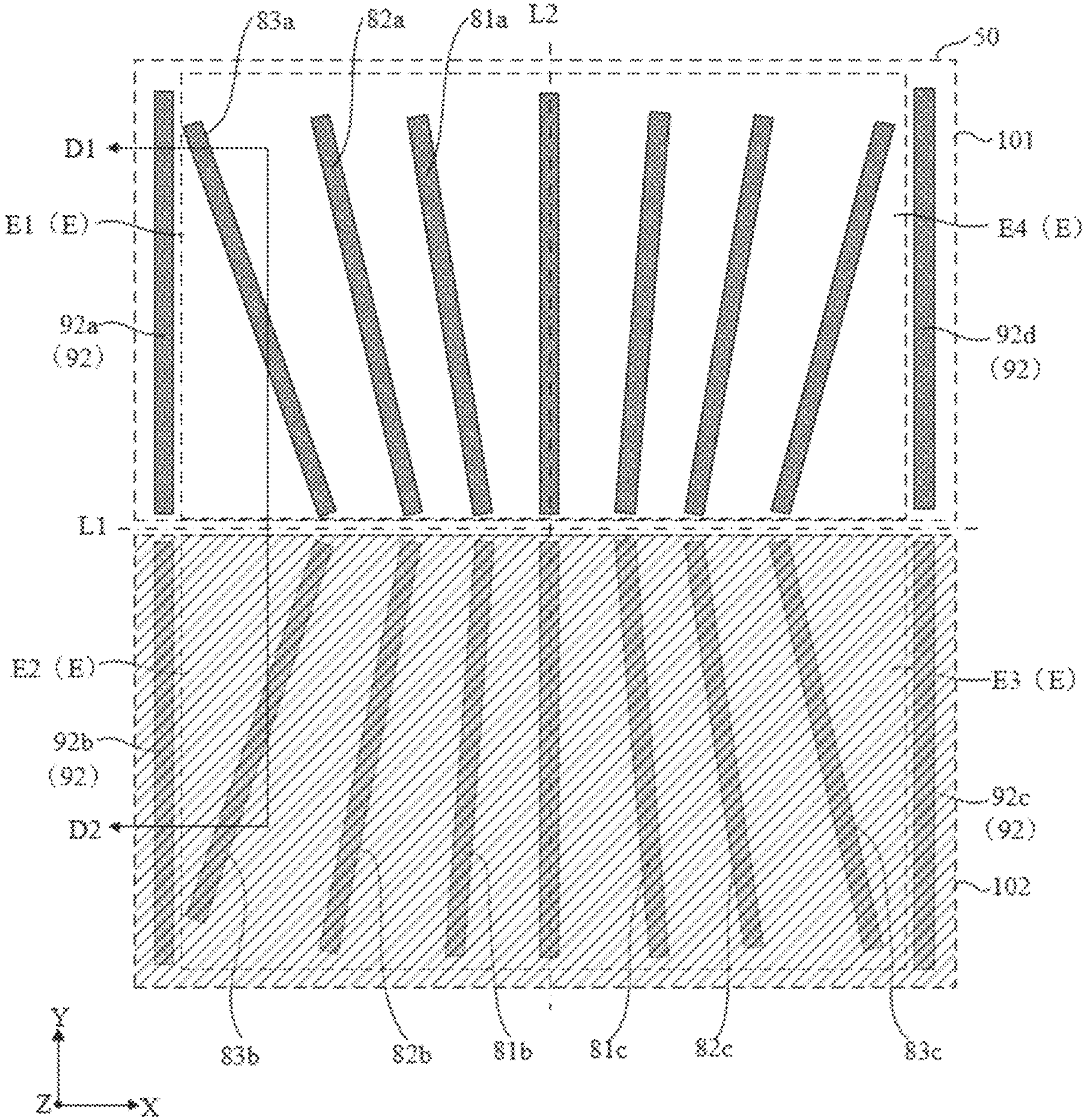
FIG. 23A is a structural diagram of a lens module provided by embodiments of the present disclosure.
Figure 23B:
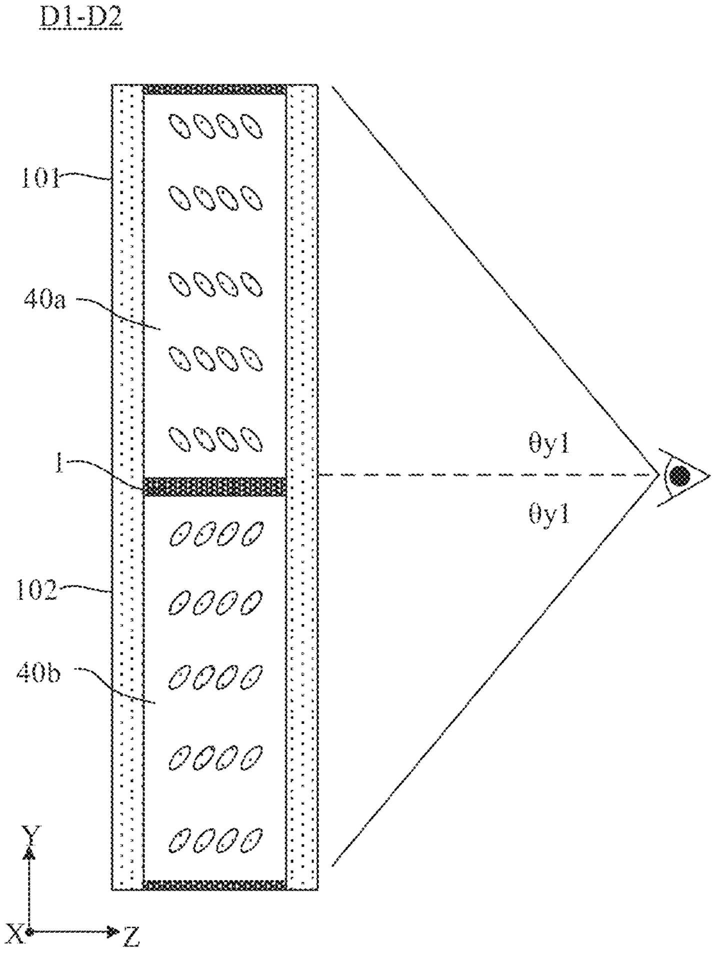
FIG. 23B is a sectional view taken along a section line D1-D2 in FIG. 23A.

FIG. 23A is a structural diagram of a lens module provided by embodiments of the present disclosure. FIG. 23B is a sectional view taken along a section line D1-D2 in FIG. 23A.

FIG. 23A only shows the structure of the second electrode layer of the lens module. The lens module includes a plurality of liquid crystal sub-lenses. Portions of the liquid crystal layer located in different liquid crystal sub-lenses are isolated from each other, and at least two of the plurality of electrode groups in the lens module are distributed in different liquid crystal sub-lenses. For example, referring to FIGS. 23A and 23B, a first liquid crystal sub-lens 101 and a second liquid crystal sub-lens 102 are tiled to form an entire liquid crystal lens as a lens module. The formed liquid crystal lens includes a first electrode group E1, a second electrode group E2, a third electrode group E3 and a fourth electrode group E4. The first electrode group E1 and the fourth electrode group E4 are distributed in the first liquid crystal sub-lens 101. The second electrode group E2 and the third electrode group E3 are distributed in the second liquid crystal sub-lens 102. The first liquid crystal sub-layer of the first liquid crystal sub-lens 101 and the second liquid crystal sub-layer of the second liquid crystal sub-lens 102 do not share a liquid crystal cell. The first liquid crystal sub-layer and the second liquid crystal sub-layer are isolated by frame sealant 1. The frame sealant 1 is incompatible with liquid crystal molecules, and may be, for example, an ultraviolet-curable adhesive with good sealing properties. The pretilt angles of the liquid crystal molecules in the first liquid crystal sub-layer and the pretilt angles of the liquid crystal molecules in the second liquid crystal sub-layer are in opposite directions. When looking up at the upper half area, an angle at which the first liquid crystal sub-lens 101 is viewed is θy1. When looking down at the lower half area, an angle at which the second liquid crystal sub-lens 102 is viewed is θy2. It can be seen from Table 1 that the simulation results in a case of looking downwards are better than the simulation results in a case of looking upwards. That is, the fitting shape of the optical path length distribution curve of the liquid crystal lens 100 at a downward viewing angle is better than the fitting shape of the optical path length distribution curve of the liquid crystal lens 100 at an upward viewing angle. With continued reference to FIG. 23A, the first electrode group E1 and the fourth electrode group E4 both refer to the driving electrode arrangement structure in a case of looking downwards in FIG. 10, and the third electrode group E3 and the second electrode group E2 still maintain the driving electrode arrangement structure in a case of looking upwards in FIG. 10. Since the upper half area is symmetrical to the lower half area, looking up at the upper half area is actually equivalent to looking down at the lower half area, and the fitting shapes of the optical path length distribution curves of the upper and lower parts are accurate, the optical path length distribution curve is close to the optical path length distribution ideal curve, and the deflection degree of light is small, thereby effectively improving the influence of 3D crosstalk at a large viewing angle.

The foregoing descriptions are merely specific implementations of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A liquid crystal lens, the liquid crystal lens being divided into a plurality of dimming areas by a horizontal center line and a vertical center line; the horizontal center line being a straight line passing through an optical center of the liquid crystal lens and extending in a first direction, and the vertical center line being a straight line passing through the optical center of the liquid crystal lens and extending in a second direction; the first direction and the second direction being perpendicular to each other;

the liquid crystal lens comprising:

a liquid crystal layer;

a first electrode layer disposed on a side of the liquid crystal layer; in a thickness direction of the liquid crystal lens, the first electrode layer corresponding to the plurality of dimming areas; and a second electrode layer disposed on a side of the liquid crystal layer away from the first electrode layer; the second electrode layer including a plurality of electrode groups; in the thickness direction of the liquid crystal lens, the electrode groups corresponding to the dimming areas; an electrode group including a row of driving electrodes arranged in the first direction, wherein at least one of the plurality of electrode groups is a specific electrode group; the specific electrode group includes a plurality of driving electrodes, and tilt angles of the plurality of driving electrodes in the specific electrode group increase in a direction away from the vertical center line in the first direction; and a tilt angle of a driving electrode is an included angle between an extending direction of the driving electrode and the second direction.

2. The liquid crystal lens according to claim 1, wherein an end of each driving electrode away from the horizontal center line is a distal end of the driving electrode, and an end of each driving electrode proximate to the horizontal center line is a proximal end of the driving electrode;

the plurality of electrode groups include a first specific electrode group and a second specific electrode group that are located on a same side of the vertical center line;

a distal end of a driving electrode in the first specific electrode group is further away from the vertical center line than a proximal end thereof; and a distal end of a driving electrode in the second specific electrode group is further away from the vertical center line than a proximal end thereof.

3. The liquid crystal lens according to claim 2, wherein the first specific electrode group and the second specific electrode group are axially symmetrical about the horizontal center line.

4. The liquid crystal lens according to claim 1, wherein an end of each driving electrode away from the horizontal center line is a distal end of the driving electrode, and an end of each driving electrode proximate to the horizontal center line is a proximal end of the driving electrode;

the specific electrode group includes a first driving electrode and a second driving electrode, and the first driving electrode is further away from the vertical center line than the second driving electrode; a distal end of the first driving electrode is closer to the vertical center line than a proximal end thereof; a distal end of the second driving electrode is closer to the vertical center line than a proximal end thereof; and a distance between the distal end of the first driving electrode and the horizontal center line is greater than a distance between the distal end of the second driving electrode and the horizontal center line.

5. The liquid crystal lens according to claim 4, wherein the distal end of the first driving electrode and/or the distal end of the second driving electrode are located on the vertical center line.

6. The liquid crystal lens according to claim 5, wherein the plurality of electrode groups include a third specific electrode group and a fourth specific electrode group that are located on both sides of the vertical center line; and at least one driving electrode in the third specific electrode group is connected to at least one driving electrode in the fourth specific electrode group.

7. The liquid crystal lens according to claim 4, wherein all driving electrodes in the specific electrode group are located on a same side of the vertical center line.

8. The liquid crystal lens according to claim 1, wherein the plurality of electrode groups include a fifth specific electrode group and a sixth specific electrode group that are located on a same side of the vertical center line; and a plurality of driving electrodes in the fifth specific electrode group are respectively connected to a plurality of driving electrodes in the sixth specific electrode group, or each driving electrode in the fifth specific electrode group is insulated from all driving electrodes in the sixth specific electrode group.

9. The liquid crystal lens according to claim 1, wherein in the specific electrode group, proximal ends of the plurality of driving electrodes have an equal spacing therebetween; and a proximal end of each driving electrode is an end of the driving electrode proximate to the horizontal center line.

10. The liquid crystal lens according to claim 1, wherein in the plurality of electrode groups, two electrode groups located on a same side of the horizontal center line are axially symmetrical about the vertical center line.

11. The liquid crystal lens according to claim 1, further comprising:

a plurality of edge electrodes, extending directions of the edge electrodes are parallel to the vertical center line, and the edge electrodes are each located on a side of an electrode group away from the vertical center line.

12. The liquid crystal lens according to claim 11, wherein the specific electrode group includes a third driving electrode and a fourth driving electrode; the third driving electrode is further away from an edge electrode adjacent to the specific electrode group than the fourth driving electrode; and a distance between a distal end of the third driving electrode and the horizontal center line is greater than a distance between a distal end of the fourth driving electrode and the horizontal center line; or a connection line of the distal end of the third driving electrode and the distal end of the fourth driving electrode is parallel to the horizontal center line; wherein a distal end of each driving electrode is an end of the driving elcetrode away from the horizontal center line.

13. The liquid crystal lens according to claim 1, wherein the plurality of driving electrodes in the specific electrode group are insulated from each other; and/or a width of the driving electrode is equal everywhere.

14. The liquid crystal lens according to claim 1, wherein the driving electrodes are in shapes of curves, and the driving electrodes are convex in a direction away from the vertical center line in the first direction;

or the driving electrodes are in shapes of straight strips.

15. The liquid crystal lens according to claim 1, further comprising:

a center electrode, a straight line where the center electrode is located coincides with the vertical center line.

16. The liquid crystal lens according to claim 1, further comprising:

a first alignment layer disposed between the liquid crystal layer and the first electrode layer, an alignment direction of the first alignment layer being parallel to the second direction;

and/or a second alignment layer disposed between the liquid crystal layer and the second electrode layer, an alignment direction of the second alignment layer being parallel to the second direction.

17. The liquid crystal lens according to claim 1, wherein the liquid crystal lens is composed of a plurality of liquid crystal sub-lenses by tiling; portions of the liquid crystal layer located in different liquid crystal sub-lenses are isolated from each other; and at least two of the plurality of electrode groups in the liquid crystal lens are distributed in different liquid crystal sub-lenses.

18. A lens module comprising a plurality of liquid crystal lenses each according to claim 1, and the plurality of liquid crystal lenses being connected.

19. A lens module, comprising a plurality of lens sub-modules configured to be tiled into at least one liquid crystal lens; the liquid crystal lens being divided into M dimming areas by at least one horizontal center line and at least one vertical center line; a horizontal center line being a straight line passing through an optical center of a liquid crystal lens and extending in a first direction, and a vertical center line being a straight line passing through the optical center of the liquid crystal lens and extending in a second direction; the first direction and the second direction being perpendicular to each other;

a lens sub-module comprising:

a liquid crystal sub-layer;

a first electrode sub-layer disposed on a side of the liquid crystal sub-layer; in a thickness direction of the liquid crystal lens, the first electrode sub-layer corresponding to N dimming areas of the liquid crystal lens, where N is greater than or equal to 1 and less than or equal to M; and a second electrode sub-layer disposed on a side of the liquid crystal sub-layer away from the first electrode sub-layer; the second electrode sub-layer including an electrode group corresponding to each of the N dimming areas; in the thickness direction of the liquid crystal lens, N electrode groups being in one-to one correspondence to the N dimming areas; the electrode group includes a row of driving electrodes arranged in the first direction, wherein at least one of the N electrode groups is a specific electrode group; the specific electrode group includes a plurality of driving electrodes, and tilt angles of the plurality of driving electrodes in the specific electrode group increase in a direction away from the vertical center line in the first direction; and a tilt angle of a driving electrode is an included angle between an extending direction of the driving electrode and the second direction.

20. A display device, comprising:

a display panel; and the liquid crystal lens according to claim 1 disposed on a light exit side of the display panel.

* * * * *